(12) United States Patent
Narita

(10) Patent No.: US 9,535,954 B2
(45) Date of Patent: Jan. 3, 2017

(54) JOIN PROCESSING DEVICE, DATA MANAGEMENT DEVICE, AND STRING SIMILARITY JOIN SYSTEM

(75) Inventor: Kazuyo Narita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 293 days.

(21) Appl. No.: 13/983,373

(22) PCT Filed: Nov. 7, 2011

(86) PCT No.: PCT/JP2011/006218
§ 371 (c)(1),
(2), (4) Date: Aug. 2, 2013

(87) PCT Pub. No.: WO2012/104943
PCT Pub. Date: Aug. 9, 2012

(65) Prior Publication Data
US 2013/0311445 A1    Nov. 21, 2013

(30) Foreign Application Priority Data

Feb. 2, 2011   (JP) .................................. 2011-020374

(51) Int. Cl.
*G06F 7/00*        (2006.01)
*G06F 17/30*       (2006.01)
(52) U.S. Cl.
CPC ... *G06F 17/30466* (2013.01); *G06F 17/30985* (2013.01)

(58) Field of Classification Search
CPC ............... G06F 17/24; G06F 17/30017; G06F 17/30781; G06F 2221/0724; G06F 17/30498; G06F 17/30466; G06F 17/30985
USPC .................. 707/689, 692, 699, 802, 999.006
See application file for complete search history.

(56) References Cited

U.S. PATENT DOCUMENTS

| | | | | |
|---|---|---|---|---|
| 4,811,207 A | * | 3/1989 | Hikita et al. | |
| 5,761,538 A | * | 6/1998 | Hull | 712/300 |
| 6,295,524 B1 | * | 9/2001 | Yianilos et al. | 706/12 |
| 6,374,241 B1 | * | 4/2002 | Lamburt et al. | |
| 6,616,704 B1 | * | 9/2003 | Birman et al. | 715/234 |
| 6,920,453 B2 | * | 7/2005 | Mannila et al. | |
| 7,567,976 B1 | * | 7/2009 | Betz et al. | |
| 7,725,421 B1 | * | 5/2010 | Gedalius et al. | 707/702 |
| 2004/0003005 A1 | * | 1/2004 | Chaudhuri et al. | 707/200 |
| 2005/0027717 A1 | * | 2/2005 | Koudas et al. | 707/100 |
| 2006/0004744 A1 | * | 1/2006 | Nevidomski et al. | 707/4 |

(Continued)

FOREIGN PATENT DOCUMENTS

WO    2007/132564 A1    11/2007

OTHER PUBLICATIONS

Arvind Arasu, et al, "Efficient Exact Set-Similarity Joins", VLDB, 2006, pp. 918-929.

(Continued)

*Primary Examiner* — Mohammed R Uddin
(74) *Attorney, Agent, or Firm* — Sughrue Mion, PLLC

(57) ABSTRACT

Provided is a join processing device that performs a similarity join process to plural tuples using an edit distance threshold value τ (positive integer). The join processing device includes a join processing unit that excludes, from a target of edit distance calculation, a pair of tuples that do not have any common character in an end portion ranging from a head character or a tail character to a (τ+1)th character in a join key string in each of the tuples.

9 Claims, 27 Drawing Sheets

(56) References Cited

U.S. PATENT DOCUMENTS

| | | |
|---|---|---|
| 2007/0016560 A1* | 1/2007 | Gu et al. ............................ 707/3 |
| 2007/0192342 A1* | 8/2007 | Shriraghav et al. ........... 707/100 |
| 2008/0082530 A1* | 4/2008 | Grabowski et al. .............. 707/6 |
| 2008/0183693 A1* | 7/2008 | Arasu et al. ....................... 707/5 |
| 2008/0208854 A1* | 8/2008 | Badr et al. ......................... 707/6 |
| 2009/0210418 A1* | 8/2009 | Arasu et al. ....................... 707/6 |
| 2009/0226098 A1* | 9/2009 | Takahashi et al. ............ 382/218 |
| 2009/0234826 A1* | 9/2009 | Bidlack ............................. 707/5 |
| 2009/0313463 A1* | 12/2009 | Pang et al. ..................... 713/150 |
| 2010/0125594 A1* | 5/2010 | Li et al. .......................... 707/758 |
| 2011/0087668 A1* | 4/2011 | Thomas et al. ............... 707/738 |

OTHER PUBLICATIONS

Roberto J. Bayardo, et al., "Scaling Up All Pairs Similarity Search", In WWW, 2006, pp. 918-929.
Chuan Xiao, et al., "Ed-Join: An Efficient Algorithm for Similarity Joins With Edit Distance Constraints", PVLDB, 2008, pp. 933-944, vol. 1, No. 1.
Jiannan Wang, et al., "Trie-Join: Efficient Trie-based String Similarity Joins with Edit-Distance Constraints", VLDB, 2010, pp. 1219-1230.
Hanmei E, et al., "Bit-parallel Computation for Wavefront Algorithm", Research reports on information science and electrical engineering of Kysushu University, Mar. 2007, pp. 1-6, vol. 12, No. 1.
Rares Vernica, et al., "Efficient Parallel Set-Similarity Joins Using MapReduce", SIGMOD, 2010, 12 pages.
International Search Report for PCT/JP2011/006218, dated Feb. 7, 2012.
Roberto J. Bayardo, et al., "Scaling Up All Pairs Similarity Search", WWW, 2007, pp. 131-140.
Jiannan Wang, et al., "Trie-Join: Efficient Trie-based String Similarity Joins with Edit-Distance Constraint", VLDB, 2010, pp. 1219-1230.
Communication dated Feb. 2, 2016, issued by the Japan Patent Office in corresponding Japanese Application No. 2012-555579.
Lianzi Wen et al., "An Approach for XML Similarity Join using Tree Serialization", IPSJ SIG Technical Report, Information Processing Society of Japan, Jul. 2, 2007, vol. 2007, No. 65 (2007-DBS-143(16)), pp. 91-96.

* cited by examiner

FIG.7

TUPLE CONTAINED IN DATA S (101)

| 101 | XWY-RS200 | COMPANY X PERSONAL COMPUTER S SERIES |

SET OF SIP TUPLES GENERATED FROM
TUPLE (101) WHEN $\tau = 2$

| | TAIL PORTION STRING | STRING LENGTH OF REMAINING HEAD PORTION STRING | TUPLE POINTER | |
|---|---|---|---|---|
| 1 | XWY-RS200 | 0 | S:101 | ADD TO sip['X'] |
| 2 | WY-RS200 | 1 | S:101 | ADD TO sip['W'] |
| 3 | Y-RS200 | 2 | S:101 | ADD TO sip['Y'] |

FIG.8

| INPUT CHARACTER | OUTPUT VALUE |
|---|---|
| X | 00 |
| Y | 01 |
| Z | 10 |
| W | 11 |

FIG.9A

| TAIL PORTION STRING | STRING LENGTH OF REMAINING HEAD PORTION STRING | TUPLE POINTER |
|---|---|---|
| XWY-RS200 | 0 | S:101 |
| X-BB-KC | 2 | S:103 |
| XYZ-CTYHTR | 0 | S:104 |
| XWZ-RS200 | 0 | R:201 |
| XWY-RS200Z | 0 | R:202 |
| X-BB-KC | 2 | R:203 |

FIG.9B

| TAIL PORTION STRING | STRING LENGTH OF REMAINING HEAD PORTION STRING | TUPLE POINTER |
|---|---|---|
| Y-RS200 | 2 | S:101 |
| YYW-ST3000X | 0 | S:102 |
| YW-ST3000X | 1 | S:102 |
| YZX-BB-KC | 0 | S:103 |
| YZ-CTYHTR | 1 | S:104 |
| Y-RS200Z | 2 | R:202 |
| YYZ-ST3001X | 0 | R:204 |
| YZ-ST3001X | 1 | R:204 |

FIG.9C

| TAIL PORTION STRING | STRING LENGTH OF REMAINING HEAD PORTION STRING | TUPLE POINTER |
|---|---|---|
| ZX-BB-KC | 1 | S:103 |
| Z-CTYHTR | 2 | S:104 |
| Z-RS200 | 2 | R:201 |
| ZZX-BB-KC | 0 | R:203 |
| ZX-BB-KC | 1 | R:203 |
| Z-ST3001X | 2 | R:204 |

FIG.9D

| TAIL PORTION STRING | STRING LENGTH OF REMAINING HEAD PORTION STRING | TUPLE POINTER |
|---|---|---|
| WY-RS200 | 1 | S:101 |
| W-ST3000X | 2 | S:102 |
| WZ-RS200 | 1 | R:201 |
| WY-RS200Z | 1 | R:202 |

FIG.11A

| PARTIAL STRING EDIT DISTANCE | LOCAL EDIT DISTANCE | LOCAL RESULT TUPLE |
|---|---|---|
| ED(S:101,R:201)=1 | LED(S:101,R:201)<br>=ED(S:101,R:201)+max(0,0)=1+0=1 | < <S:101,R:201>, 1> |
| ED(S:101,R:202)=1 | LED(S:101,R:202)<br>=ED(S:101,R:202)+max(0,0)=1+0=1 | < <S:101,R:202>, 1> |
| ED(S:101,R:203)=7 | | |
| ED(S:103,R:201)=7 | | |
| ED(S:103,R:202)=8 | | |
| ED(S:103,R:203)=0 | LED(S:103,R:203)<br>=ED(S:103,R:203)+max(2,2)=0+2=2 | < <S:103,R:203>, 2> |
| ED(S:104,R:201)=7 | | |
| ED(S:104,R:202)=8 | | |
| ED(S:104,R:203)=8 | | |

FIG.11B

| PARTIAL STRING EDIT DISTANCE | LOCAL EDIT DISTANCE | LOCAL RESULT TUPLE |
|---|---|---|
| ED(S:101,R:202)=1 | LED(S:101,R:202)<br>=ED(S:101,R:202)+max(2,2)=1+2=3 | |
| ED(S:101,R:204)=7 | | |
| ED(S:101,R:204)=6 | | |
| ED(S:102,R:202)=7 | | |
| ED(S:102,R:204)=2 | LED(S:102,R:204)<br>=ED(S:102,R:204)+max(0,0)=2+0=2 | < <S:102,R:204>, 2> |
| ED(S:102,R:204)=3 | | |
| ED(S:102,R:202)=6 | | |
| ED(S:102,R:204)=3 | | |
| ED(S:102,R:204)=2 | LED(S:102,R:204)<br>=ED(S:102,R:204)+max(1,1)=2+1=3 | |
| ED(S:103,R:202)=8 | | |
| ED(S:103,R:204)=9 | | |
| ED(S:103,R:204)=8 | | |
| ED(S:104,R:202)=7 | | |
| ED(S:104,R:204)=7 | | |
| ED(S:104,R:204)=6 | | |

FIG.11C

| PARTIAL STRING EDIT DISTANCE | LOCAL EDIT DISTANCE | LOCAL RESULT TUPLE |
|---|---|---|
| ED(S:103,R:201)=6 | | |
| ED(S:103,R:203)=1 | LED(S:103,R:203)<br>=ED(S:103,R:203)+max(1,0)=1+1=2 | < <S:103,R:203>, 2> |
| ED(S:103,R:203)=0 | LED(S:103,R:203)<br>=ED(S:103,R:203)+max(1,1)=0+1=1 | < <S:103,R:203>, 1> |
| ED(S:103,R:204)=8 | | |
| ED(S:104,R:201)=6 | | |
| ED(S:104,R:203)=8 | | |
| ED(S:104,R:203)=7 | | |
| ED(S:104,R:204)=6 | | |

FIG.11D

| PARTIAL STRING EDIT DISTANCE | LOCAL EDIT DISTANCE | LOCAL RESULT TUPLE |
|---|---|---|
| ED(S:101,R:201)=1 | LED(S:101,R:201)<br>=ED(S:101,R:201)+max(1,1)=1+1=2 | < <S:101,R:201>, 2> |
| ED(S:101,R:202)=1 | LED(S:101,R:202)<br>=ED(S:101,R:202)+max(1,1)=1+1=2 | < <S:101,R:202>, 2> |
| ED(S:102,R:201)=5 | | |
| ED(S:102,R:202)=5 | | |

FIG.13

| LOCAL RESULT TUPLE |
|---|
| < <S:101,R:201>, 1> |
| < <S:101,R:202>, 1> |
| < <S:102,R:204>, 2> |
| < <S:103,R:203>, 1> |

SIP TUPLE SET FOR CHARACTER "a"

| TAIL PORTION STRING | STRING LENGTH OF REMAINING HEAD PORTION STRING | TUPLE POINTER |
|---|---|---|
| abaa | 0 | s1 |
| aa | 2 | s1 |
| acaa | 1 | s2 |
| abcaa | 0 | s3 |
| aca | 2 | s4 |

TREE STRUCTURE tree_a FOR CHARACTER "a"

SIP TUPLE SET FOR CHARACTER "b"

| TAIL PORTION STRING | STRING LENGTH OF REMAINING HEAD PORTION STRING | TUPLE POINTER |
|---|---|---|
| baa | 1 | s1 |
| bacaa | 0 | s2 |
| bcaa | 1 | s3 |
| baca | 1 | s4 |

TREE STRUCTURE tree_b FOR CHARACTER "b"

SIP TUPLE SET FOR CHARACTER "c"

| TAIL PORTION STRING | STRING LENGTH OF REMAINING HEAD PORTION STRING | TUPLE POINTER |
|---|---|---|
| caa | 2 | s2 |
| caa | 2 | s3 |
| cbaca | 0 | s4 |

TREE STRUCTURE tree_c FOR CHARACTER "c"

FIG.19

| NODE | WEIGHT | ACTIVE LIST |
|---|---|---|
| 0:a (root) | 0 | <0,0,0>,<1,0,1>,<0,1,1>,<4,1,2>,<0,2,2> |
| 1:b | 0 | <0,0,1>,<1,0,0>,<2,0,1>,<7,0,1>,<0,1,2>,<4,1,2> |
| 2:a | 0 | <0,0,2>,<1,0,1>,<2,0,0>,<u>3,0,1</u>>,<7,0,2>,<8,0,1>,<5,1,2> |
| <u>3:a</u> | 0 | <1,0,2>,<2,0,1>,<u>3,0,0</u>>,<8,0,2>,<u>9,0,1</u>>,<u>6,1,2</u>> |

JOIN PROCESSING DEVICE, DATA MANAGEMENT DEVICE, AND STRING SIMILARITY JOIN SYSTEM

CROSS REFERENCE TO RELATED APPLICATIONS

This application is a National Stage of International Application No. PCT/JP2011/006218 filed Nov. 7, 2011, claiming priority based on Japanese Patent Application No. 2011-020374 filed Feb. 2, 2011, the contents of all of which are incorporated herein by reference in their entirety.

TECHNICAL FIELD

The present invention relates to a string similarity join technique.

BACKGROUND ART

A string similarity join is a technique for detecting all pairs of a given element s and a given element r from element sets S and R, respectively, in a manner such that a distance between strings contained in the individual elements of each pair satisfies a condition of a threshold value. For the measurement of distances between strings, there exist various types of distance scales having different characteristics such as Jaccard index, cosine index, and edit distance.

The edit distance represents the minimum number of procedures (inserting, deleting or replacing a letter) necessary for converting one string to another string. For example, it determines how many procedures including inserting, deleting or replacing letters are necessary in order to calculate an edit distance between two strings "kitten" and "sitting" to convert the word "kitten" (or "sitting") into the word "sitting" (or "kitten"). In this case, the string "kitten" can be converted into the string "sitting" by replacing "k" with "s," replacing "e" with "i," and inserting "g." Thus, the edit distance between the string "kitten" and the string "sitting" is three (replacing twice and inserting once).

Hereinafter, the string similarity join is also simply referred to as a string join or join. Further, a tuple set serving as an input of the string similarity join is also referred to as data or input data. Each tuple set contains at least one tuple. The tuple is formed by plural attribute values. The tuple contained in the input data contains at least one string as an attribute value. Hereinafter, an attribute having a string set thereto as the attribute value is also referred to as a string attribute. The string attribute used as a key in the string similarity join is referred to as a join key attribute, and a value of the join key attribute is referred to as a join key or join key string.

FIG. 20 is a schematic view illustrating an example of the string similarity join employing the edit distance. In the example illustrated in FIG. 20, the tuple sets S and R serve as the input data. The input data S and R each have a string attribute "product number," and the string attribute "product number" is used as the join key attribute. The string similarity join detects all pairs of a tuple s and a tuple r that satisfy a condition in which the edit distance between a join key of the tuple s contained in the input data S and a join key of the tuple r contained in the input data R is less than or equal to a predetermined threshold value (for example, two).

Hereinafter, the edit distance between the join key of the tuple s and the join key of the tuple r is also referred to as an edit distance between the tuples s and r, an edit distance of a tuple pair (s, r), or an edit distance between a tuple s and a tuple r. Further, in the case where an edit distance of a certain tuple pair is less than or equal to a predetermined threshold value τ, the tuples s and r of this pair are referred to as "having similarity."

In the left table in the lower portion of FIG. 20, the output results of the string similarity join process are shown. In the example illustrated in FIG. 20, four pairs having the edit distance less than or equal to 2 are outputted. In the example illustrated in FIG. 20, each of the tuples of the outputted pair is indicated with a tuple pointer formed by a tuple identifier for identifying a tuple and a data identifier for identifying a tuple set (data) containing this tuple. The tuple identifier is a value of an attribute TID. Further, for example, in a first line of a table located left below in FIG. 20, a pair of a tuple s indicated with a tuple pointer (S:101) and a tuple r indicated with a tuple pointer (R:201) is shown. In the example illustrated in FIG. 20, the tuple s is a tuple having a value of the attribute TID of 101 in an input data S, and the tuple r is a tuple having a value of the attribute TID of 201 in the input data R.

The table located right below in FIG. 20 shows an integrated state in which the tuple s and the tuple r in each of the pairs contained in the results of the string similarity join process shown in the table located left below are integrated into one tuple.

Methods of the string similarity join employing such an edit distance are proposed, for example, in Non-patent Documents 1 to 4 below. These methods employ different approaches according to average string lengths of input data serving as a target. Here, the average string length of the input data means an average of lengths of strings (number of characters) serving as the join key in each input tuple. Thus, when the average of the lengths of strings serving as the join key in each tuple is short, it is indicated that the input data has a short average string length.

In the method proposed in Non-patent Documents 1 to 3, the target is set to input data having a relatively long average string length such as a text. In general, the time required for calculating the long edit distance between strings is long. Thus, in the case where data having a long average string length is targeted, the time required for the string join process increases. In view of the facts described above, the methods proposed in Non-patent Documents 1 to 3 subject the join key to signature to convert the join key into short bit stream, calculate a distance between signatures (or degree of similarity), and leave pairs of tuples that are highly likely to have a similarity (filtering). Thus, by calculating edit distances only for filtered pairs from among all the pairs in the input tuple (refining), it is possible to increase the speed of the string similarity join process.

Non-patent Document 4 proposes an approach different from the filter-and-refine approach, and targets data having a relatively short average string length. The method proposed in Non-patent Document 4 first stores all the join keys of the input data S and R in one trie (Trie). The trie represents a data structure that can express plural strings in a compressed manner, and is frequently used as an index for the string. In general, with the trie that stores a set formed by short strings, it is possible to search the tree in a relatively short period of time. The method proposed in Non-patent Document 4 searches the trie that stores all the join keys, and calculates the edit distance between the join keys, thereby performing the join for the data having relatively short average string lengths at a relatively high speed.

As described above, with the string similarity join, the edit distances are calculated for all the pairs of tuples in the input data S and the input data R, and hence, the time required for the processing increases with an increase in the data volume in the input data S and the input data R. In view of the facts described above, Non-patent Documents 5 and 6 propose a method of processing the string similarity join in parallel to reduce the time required for the entire processing. The method proposed in Non-patent Document 5 employs the filter-and-refine approach in a parallel manner, and is suitable for data having a long average string length. The method proposed in Non-patent Document 6 employs a distance scale different from that for the edit distance, and performs the parallel processing for the string similarity join using characteristics of the distance scale.

RELATED DOCUMENT

Non-Patent Document

Non-patent Document 1: A. Arasu, V. Ganti, R. Kaushik, "Efficient Exact Set-Similarity Joins", In VLDB, pages 918-929, 2006.
Non-patent Document 2: R. J. Bayardo, Y. Ma, R. Srikant, "Scaling up all pairs similarity search", In WWW, pages 131-140, 2007.
Non-patent Document 3: C. Xiao, W. W. 0011, X. Lin, "Ed-Join: An Efficient Algorithm for Similarity Joins With Edit Distance Constraints", PVLDB, 1(1):933-944, 2008.
Non-patent Document 4: J. Wang, J. Feng, G. Li, "Trie-Join: Efficient Trie-based String Similarity Joins with Edit-Distance Constraint", VLDB, 2010.
Non-patent Document 5: Hanmei E, K. Baba, Yunqing Yu, K. Murakami, "Bit-parallel Computation for Wavefront Algorithm", Research reports on information science and electrical engineering of Kyushu University, 12(1), p 1-6, 2007-03.
Non-patent Document 6: R. Vernica, M. J. Carey, C. Li, "Efficient Parallel Set-Similarity Joins Using MapReduce", SIGMOD 2010.

SUMMARY OF THE INVENTION

However, with the string similarity join method and the parallel process method for the string similarity join as described above, it is necessary to apply a certain limitation to the distance scale for the join key or the string of the input data to achieve appropriate performance. For example, the filter-and-refine approach is not suitable for the data having a short average string length. This is because the large number of candidates is more likely to remain after filtering, and hence, it takes a long period of time to perform the refining process. Further, the methods proposed in Non-patent Documents 5 and 6 are not directed to the string similarity join employing the edit distance as the distance scale for the string.

Here, there is a following simple method designed for the parallel processing for the string similarity join employing the edit distance. For example, it is assumed that the processing target is set to data S containing m pieces of tuples and data R containing n (m≥n) pieces of tuples, N pieces of processing hosts are used, and the join processes are performed in parallel.

Then, a data host retaining the data R generates N pieces of duplicates of the data R, and distributes the data R to processing hosts. Further, a data host retaining the data S divides the data S into N pieces of subsets, and distributes the subsets to the processing hosts. The processing hosts uses the data distributed from each of the data hosts to perform the join to n pieces of tuples and (m/N) pieces of tuples. With this method, it is possible to calculate the edit distances for all the pairs of the tuple s contained in the data S and the tuple r contained in the data R while accurately detecting the pairs that satisfy the threshold value.

The data host described above is also referred to as a data management device. Further, the processing host described above is also referred to as a join processing device.

In this method, (N×n+m) pieces of tuples are to be processed in total. Thus, with the increase in the values of m, n, and N, the time required for obtaining N pieces of duplicates of the data R largely increases, and the cost of communication from the data host to the processing host increases. In the parallel processing, the cost of communication occupies large portion of the entire processing cost, and hence, the increase in the cost of the communication cannot be ignored. In other words, with the method described above, in the case where the volume of input data is large and the large number of the processing hosts serving as the distribution destination exists, the entire processing time increases.

As described above, in the string similarity join employing the edit distance, the processing time increases with the increase in the volume of the input data, and hence, the processing time can be reduced by performing the join processes in parallel. However, in the case where the join processes are performed in parallel, it is necessary that all the pairs in the data S and the data R are distributed as the join target into the plural processing hosts. In other words, the data S and the data R have to be distributed in a manner such that all the similar pairs that should be detected are processed without fail.

An object of the present invention is to provide a technique for performing the string similarity join employing the edit distance in an appropriate and a rapid manner.

In order to solve the problems described above, each aspect of the present invention employs the following configurations.

A first aspect of the present invention relates to a join processing device that performs a similarity join process to plural tuples using an edit distance threshold value τ (positive integer). The join processing device according to the first aspect includes a join processing unit that excludes, from a target of edit distance calculation, a pair of tuples that do not have any common character in an end portion ranging from a head character or a tail character to the (τ+1)th character in a join key string in each of the plural tuples.

A second aspect of the present invention relates to a data management device communicatively connected to plural join processing devices that each perform a similarity join process to plural tuples using an edit distance threshold value τ (positive integer). The data management device according to the second aspect includes: a data storage unit that stores the plural tuples; and a data distributing unit that determines a distribution destination of each of the tuples stored in the data storage unit to be a join processing device that processes each of the tuples from among the plural join processing devices in a manner such that each of the tuples is distributed to the distribution destination same as that of another tuple containing, in an end portion ranging from a head character or tail character to a (τ+1)th character in a join key string thereof, at least one character that the each of the tuples contains in the end portion in the join key string thereof, and is not distributed to a distribution destination same as that of another tuple that does not contain any character common to that in the end portion in the join key string of each of the tuples.

A third aspect of the present invention relates to a string similarity join system including at least one data management device and plural join processing devices that each perform a similarity join process to plural tuples stored in the at least one data management device using an edit distance threshold value τ (positive integer). In the string similarity join system according to the third aspect, the at least one data management device includes a key information generating unit that generates, for a join key string of each of the tuples, (τ+1) pieces of key information tuples containing a combination of a tail portion string ranging from a tail character to an i-th character (i is a positive integer less than or equal to (τ+1)) counted from a head character, a string length of the remaining head portion string, and tuple identifying data, or a combination of a head portion string ranging from the head character to an i-th character counted from the tail character, a string length of the remaining tail portion string, and the tuple identifying data; and a data distributing unit that determines a distribution destination of each of the key information tuples on the basis of the head character of the tail portion string or the tail character of the head portion string contained in each of the key information tuples generated by the key information generating unit, and distributes, as data on each of the tuples, each of the key information tuples to each of the join processing devices determined to be the distribution destination. Further, the plural join processing devices each include: a receiving unit that receives the plural key information tuples distributed from the at least one data management device; and a join processing unit that performs the similarity join process for each set of key information tuples having the head character of the tail portion string or the tail character of the head portion string common to each other from among the plural key information tuples received by the receiving unit.

It should be noted that another aspect of the present invention may provide a string similarity join method that causes at least one computer to perform each of the processes contained in first to third aspects described above, or may provide a program that causes at least one computer to perform each of the configurations contained in first to third aspects, or may provide a computer-readable storage medium that records such a program. This storage medium includes a non-transitory tangible medium.

According to the aspects described above, it is possible to provide a technique of performing the string similarity join employing the edit distance in an appropriate and a rapid manner.

BRIEF DESCRIPTION OF THE DRAWINGS

FIG. 7 is a schematic view illustrating an example of generating a SIP tuple.

FIG. 8 is a diagram illustrating an example of input-and-output of a hash function used for determining a distribution destination.

FIG. 9A is a diagram illustrating an example of distributing a SIP tuple concerning input tuple sets S and R in FIG. 20.

FIG. 9B is a diagram illustrating an example of distributing a SIP tuple concerning input tuple sets S and R in FIG. 20.

FIG. 9C is a diagram illustrating an example of distributing a SIP tuple concerning input tuple sets S and R in FIG. 20.

FIG. 9D is a diagram illustrating an example of distributing a SIP tuple concerning input tuple sets S and R in FIG. 20.

FIG. 11A is a diagram illustrating an example of a partial string edit distance, a local edit distance, and a local result tuple calculated from the SIP tuple set in FIG. 9A.

FIG. 11B is a diagram illustrating an example of a partial string edit distance, a local edit distance, and a local result tuple calculated from the SIP tuple set in FIG. 9B.

FIG. 11C is a diagram illustrating an example of a partial string edit distance, a local edit distance, and a local result tuple calculated from the SIP tuple set in FIG. 9C.

FIG. 11D is a diagram illustrating an example of a partial string edit distance, a local edit distance, and a local result tuple calculated from the SIP tuple set in FIG. 9D.

FIG. 13 is a diagram illustrating an example of the results of a join process finally obtained by the system controlling device.

FIG. 19 is a diagram illustrating an example of an active list.

DESCRIPTION OF EMBODIMENTS

Figure 1:
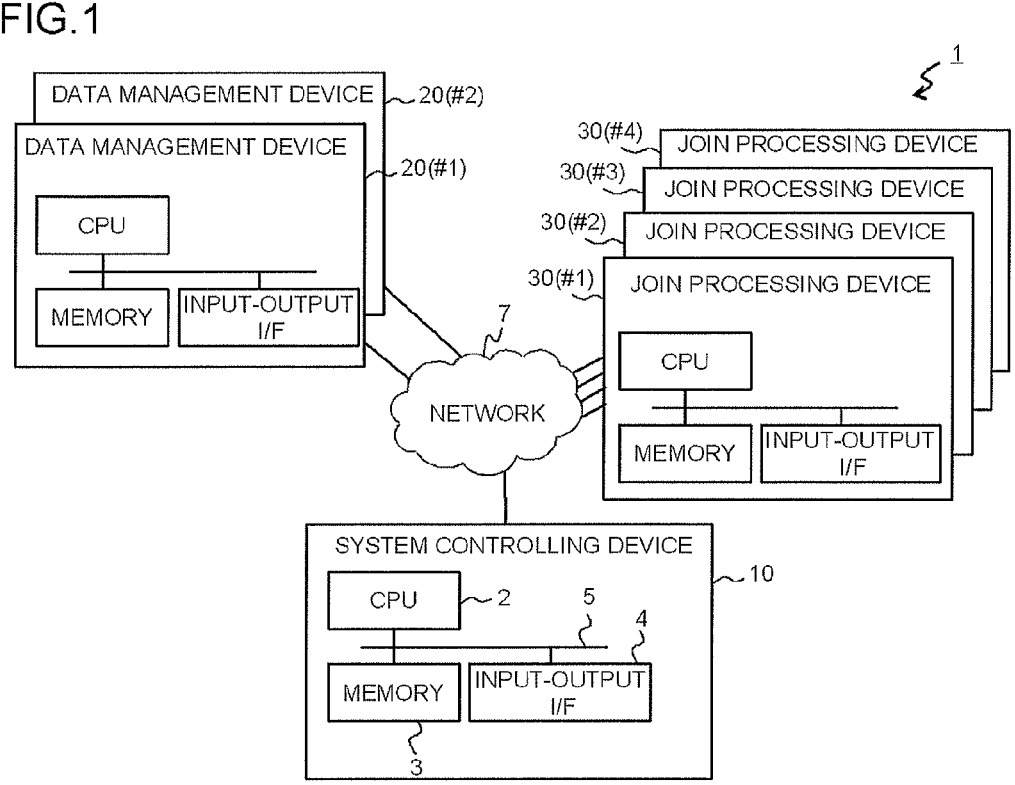
FIG. 1 is a schematic view illustrating an example of a configuration of a string similarity join system according to a third exemplary embodiment.

Hereinbelow, exemplary embodiments of the present invention will be described. Note that each of the exemplary embodiments described below is merely an example, and the present invention is not limited to the configuration of each of the exemplary embodiment described below.

First Exemplary Embodiment

A join processing device according to a first exemplary embodiment performs a similarity join process to plural tuples using an edit distance threshold value τ (τ is a positive integer, and the edit distance threshold value is also simply referred to a threshold value τ). This join processing device includes a join processing unit that excludes, from the target of the edit distance calculation, pairs of tuples that do not have any common characters in an end portion ranging from the head character or the tail character to the (τ+1)th character in a join key string of each of the tuples.

Thus, while the edit distances are calculated for all the tuple pairs of data serving as the target of the similarity join process in the conventional technique, the pairs of tuples that do not have any common character in the end portion are excluded in the first exemplary embodiment. This makes it possible to reduce the processing cost and reduce the time required for the similarity join process in the system as a whole, as compared with the conventional technique. Further, according to the first exemplary embodiment, all the pairs of tuples that have to be detected are processed without fail, and hence, it is possible to output the appropriate similarity join process results.

Described below is the reason that the first exemplary embodiment can achieve such an effect. As described above, in the similarity join process, it is necessary to apply the calculation process for the edit distances of the join keys, the comparison process between the edit distance and the edit distance threshold value τ or other processes to all the tuple pairs in the data serving as the processing target. For example, in the string similarity join between the input data S and the input data R, the total number of tuple pairs is a value obtained through multiplication of the number of tuples in the input data S and the number of tuples in the input data R, which results in the vast amount of processing time.

Thus, in the first exemplary embodiment, before the edit distance is actually calculated, the tuple pairs having the edit distance exceeding the edit distance threshold value τ is determined, and the determined tuple pairs are excluded from the target of the similarity join process. With these operations, the number of tuple pairs subjected to the edit distance calculation or other process can be reduced, whereby it is possible to reduce the time required for the similarity join process as a whole.

In the case where the end portion of each of the join key strings in the tuple s and the tuple r does not have any common character, the number of characters in the end portion is (τ+1), and hence, the edit distance in the tuple s and the tuple r is obviously greater than a threshold value τ. For example, in the case where the join key string in tuple s is "abcdef," the join key string in tuple r is "ghidef," and the threshold value τ is 2, the string in the end portion of the tuple s is "abc," the string in the end portion of the tuple r is "ghi," so that there is no common character between them. At this point in time, the edit distance in the tuple s and the tuple r obviously exceeds the threshold value τ, and hence, it can be readily understood that the calculation of the edit distance is not necessary for the pair of the tuple s and the tuple r. Note that the actual edit distance is 3.

Thus, as described in the first exemplary embodiment, even if the pairs of tuples that do not have any common character in the end portion are excluded from the target of the edit distance calculation, all the pairs of tuples that should be detected are processed without fail, and it is possible to output the appropriate similarity join process results.

On the other hand, if there exists any character common to the end portions in the tuples, there is a possibility that the edit distance is less than or equal to the threshold value τ. Thus, the join processing device according to the first exemplary embodiment sets the pair of tuples having at least one common character in the end portion of the tuples for the target of the edit distance calculation.

Second Exemplary Embodiment

A data management device according to a second exemplary embodiment is connected to plural join processing devices that each perform the similarity join process for the plural tuples using the threshold value τ in a manner that they can communicate with each other. This data management device includes a data storage unit that stores the plural tuples, and a data distributing unit that determines a join processing device that processes each of the tuples stored in the data storage unit to be a distribution destination of each of the tuples, this determination being made in a manner such that one tuple is distributed to the distribution destination same as that of another tuple containing, in an end portion ranging from the head character or the tail character to the (τ+1)th character in the join key string thereof, at least one character that the one tuple contains in the end portion in the join key string, and is not distributed to a distribution destination same as that of another tuple that does not contain any character common to that in the end portion in the join key string of the one tuple.

The data management device according to the second exemplary embodiment distributes each of the tuples stored in the data storage unit and subjected to the similarity join process to at least one of the plural join processing devices, and the plural join processing devices perform the similarity join process in parallel, thereby increasing the speed of the string similarity join process. Here, the plural tuples subjected to the similarity join process may be extracted from one tuple set stored in the data storage unit of one data management device, or may be extracted from plural tuple sets stored in the data storage unit of one data management device, or may be extracted from plural tuple sets stored in the data storage units of plural data management devices.

The similarity join process performed in the plural join processing devices may be performed using known methods as described above. Here, each of the join processing devices represent a unit capable of performing the similarity join process, and may be one computer or may be one central processing unit (CPU). Thus, in the case of a computer including plural circuit boards each provided with a CPU, the plural join processing devices may be realized with one computer.

The data management device determines that each of the tuples stored in the data storage unit is distributed to the distribution destination same as that of another tuple containing, in an end portion ranging from the head character or the tail character to the (τ+1)th character in the join key string thereof, at least one character that each of the tuples contains in the end portion in the join key string. Here, the other tuple described above may be a tuple stored in the data storage unit of the data management device itself, or may be a tuple retained in another data management device.

As a result, one join processing device performs the similarity join process for pairs of tuples having at least one common character in the end portion ranging from the head character to the (τ+1)th character in the join key string, or for pairs of tuples having at least one common character in the end portion ranging from the tail character to the (τ+1)th character in the join key string. On the other hand, the pair of tuples that do not have any common character in the end portion in the join key string is not distributed to the same join processing device, and hence, is excluded from the target of the edit distance calculation.

In other words, in the second exemplary embodiment, whether or not a pair of tuples is subjected to the edit distance calculation is determined depending on whether or not the pair of the tuples is distributed to the same join processing device. Thus, according to the second exemplary embodiment, it is possible to achieve an effect similar to that of the first exemplary embodiment.

Third Exemplary Embodiment

System Configuration

FIG. 1 is a schematic view illustrating an example of a configuration of a system according to a third exemplary embodiment. A system 1 according to the third exemplary embodiment includes, for example, a system controlling device 10, data management devices 20(#1) and 20(#2), and join processing devices 30(#1), 30(#2), 30(#3), and 30(#4). Hereinbelow, the data management device and the join processing device are denoted as a data management device 20 and a join processing device 30, respectively, except when these need to be separately described.

The system controlling device 10 receives a request for the similarity join process, and controls the data management device 20 and the join processing device 30 to perform the similarity join process in accordance with the request. The system controlling device 10 receives join results transmitted from each of the join processing devices 30, and outputs the final results of the string similarity join process.

The data management device 20 manages at least one item of data (tuple set) serving as the join process target. In the third exemplary embodiment, the data management devices 20(#1) and 20(#2) each manage the data. As in the first exemplary embodiment, the data management device 20 determines a distribution destination of each of the tuples constituting the data that this data management device 20 manages, and distributes data concerning each of the tuples to the join processing device 30 serving as the determined distribution destination. More specifically, in the third exemplary embodiment, SIP tuples, which will be described later, are distributed as the data concerning each of the tuples.

The join processing device 30 identifies tuple pairs having edit distances that satisfy conditions of an edit distance threshold value τ on the basis of the data distributed from the data management device 20, and transmits the data concerning the identified tuple pairs as the join results to the system controlling device 10.

The system controlling device 10, the data management device 20, and the join processing device 30 are connected to each other through a network 7 in a manner that they can communicate with each other. The network 7 includes, for example, a public network such as the Internet, a wide area network (WAN), a local area network (LAN), and a wireless communication network. Note that, in this exemplary embodiment, the communication protocol between the devices, the form of network and the like are not limited, provided that these devices are connected to each other in a manner that they can communicate with each other.

As illustrated in FIG. 1, each of the system controlling device 10, the data management device 20, and the join processing device 30 includes, as a hardware configuration, a CPU 2, a memory 3 such as a random access memory (RAM), a read only memory (ROM, not illustrated), and a hard disk drive (HDD), and an input-output interface (I/F) 4. These hardware elements are connected, for example, through a bus 5. The input-output I/F 4 includes a network interface that enables communication with other devices through the network 7. This exemplary embodiment does not limit the hardware configuration of each of the devices.

Further, this exemplary embodiment does not limit the number of the data management devices 20 and the join processing devices 30. In the case where the data on the join process target are retained in one data management device 20, it is only necessary that one data management device 20 exists. The number of the join processing devices 30 is set to 2 or more, and is less than or equal to the number of types of characters appearing in the input data. The basis for choice of the number of these devices will be described later.

[Device Configuration]

Described below are specific configurations of the devices constituting the system 1 according to the third exemplary embodiment.

<System Controlling Device>

Figure 2:
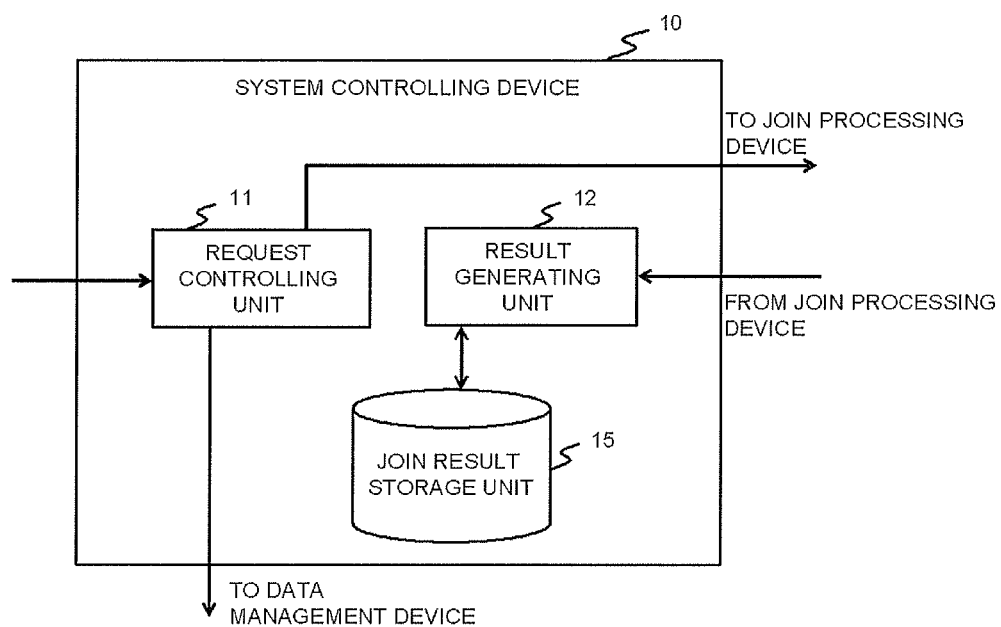
FIG. 2 is a block diagram schematically illustrating a configuration example of a system controlling device.

FIG. 2 is a block diagram schematically showing a configuration example of the system controlling device 10. As illustrated in FIG. 2, the system controlling device 10 includes, for example, a request controlling unit 11, a result generating unit 12, and a join result storage unit 15. The request controlling unit 11 and the result generating unit 12 are realized, for example, with the CPU 2 running a program stored in the memory 3. Further, the join result storage unit 15 is realized, for example, on the memory 3.

The request controlling unit 11 acquires a processing request for the string similarity join, generates an execution instruction on the basis of details of the acquired processing request, and transmits the execution instruction through a communication interface of the input-output I/F 4 to the data management device 20 and the join processing device 30. Here, the processing request includes a data identifier for identifying data serving as the join process target, information on a join key attribute of the target data, and a threshold value τ. This processing request may be acquired from an external device through a communication, or may be inputted through a user interface (not illustrated) of the system controlling device 10.

The execution instruction transmitted to the data management device 20 is a communication message including network address information such as an internet protocol (IP) address and a port of the join processing device 30, and each data and threshold value τ included in the processing request. Further, the execution instruction transmitted to the join processing device 30 is a communication message including, for example, an data identifier, a threshold value τ, network address information such as an IP address of the join processing device 30, network address information such as an IP address of the system controlling device 10. This exemplary embodiment does not limit the format of the communication message.

The join result storage unit 15 stores a local join result of a string similarity join transmitted from each of the join processing devices 30. In the case where the join processing device 30 contains pairs of tuples whose edit distance is estimated to satisfy the condition of the threshold value τ, this local join result includes as many local result tuples as the number of pairs of tuples. The local result tuple includes an edit distance estimation value, and pairs of tuple pointers for identifying the pair of tuples.

The edit distance estimation value is a value calculated by the join processing device 30, and hereinafter, is also referred to as a local edit distance. Details of this local edit distance will be described later. The tuple pointer is identification information for identifying one tuple from among all the tuples treated in the system 1, and is also referred to as tuple identifying data. In this exemplary embodiment, the tuple pointer is formed by a tuple identifier for identifying a certain tuple in a certain tuple set (data), and a data identifier for identifying the tuple set (data). Note that, in the case where the tuple identifier is set in a unique manner for all the tuples treated in the system 1, the tuple pointer may be formed only by the tuple identifier.

The result generating unit 12 acquires the local join result from each of the join processing devices 30 through the communication interface of the input-output I/F 4. When the acquired local join result is stored in the join result storage unit 15, the result generating unit 12 detects the local result tuples containing the pair of the same tuple pointers, and stores only the local result tuple having the minimum local edit distance of all the detected local result tuples, in the join result storage unit 15 as information on the pair of tuples having the edit distance that satisfies the conditions of edit distance threshold value τ.

[Data Management Device]

Figure 3:
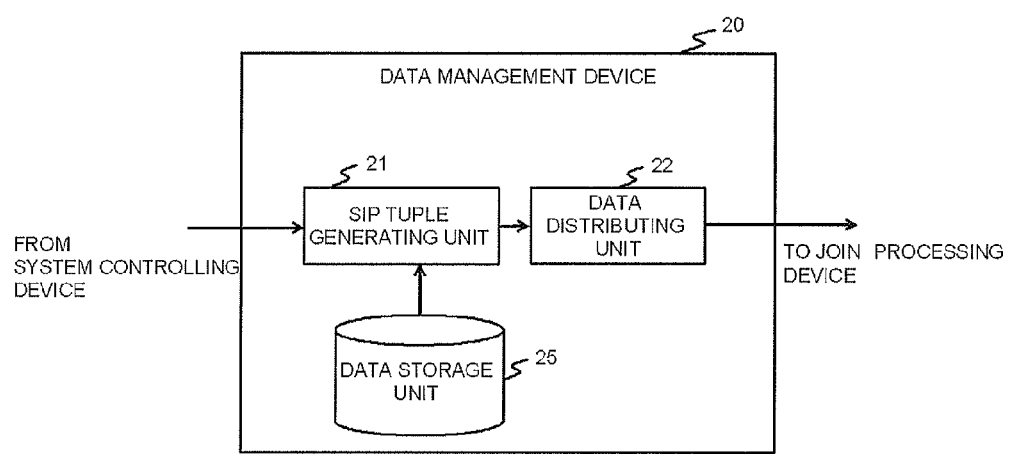
FIG. 3 is a block diagram schematically illustrating a configuration example of a data management device.

FIG. 3 is a block diagram schematically showing a configuration example of the data management device 20. As illustrated in FIG. 3, the data management device 20 includes, for example, a SIP tuple generating unit 21, a data distributing unit 22, and a data storage unit 25. The SIP tuple generating unit 21 and the data distributing unit 22 are realized, for example, with the CPU running a program stored in the memory. Further, the data storage unit 25 is realized, for example, on the memory.

The data storage unit 25 stores data (tuple set) and a data identifier for identifying the data. In the example illustrated in FIG. 20, the data storage unit 25 stores at least one of the input tuple set S and the input tuple set R, and at least one of an identifier S and an identifier R thereof. As described above, the data storage unit 25 may store plural items of data having different data identifiers.

The SIP tuple generating unit 21 receives an execution instruction from the system controlling device 10 through the communication interface of the input-output I/F 4, and extracts data corresponding to the data identifier contained in this execution instruction from the data storage unit 25. In the example illustrated in FIG. 20, in the case where the execution instruction contains the data identifier R, the SIP tuple generating unit 21 extracts all the tuples in the input tuple set R.

The SIP tuple generating unit 21 generates (τ+1) pieces of SIP tuples concerning each of the tuples contained in the extracted data. The SIP tuple relates to the join key string in the tuple, and is formed by a combination of a tail portion string ranging from the tail character to the i-th character (i is a positive integer less than or equal to (τ+1)) counted from the head character, the string length of the remaining head portion string, and the tuple pointer, or a combination of a head portion string ranging from the head character to the i-th character counted from the tail character, the string length of the remaining tail portion string, and the tuple pointer. The join key in each of the tuples is identified on the basis of the information of the join key attribute contained in the execution instruction transmitted from the system controlling device 10.

Here, the SIP tuple of the tuple s can be expressed as <st_i, |sh_i|, s_ptr>, where, in the join key string in the tuple s, st_i is the tail portion string ranging from the tail character to the i-th character counted from the head character, |sh_i| is the string length of the remaining head portion string, and the s_ptr is the tuple pointer of the tuple s. Further, |sh_i| is equal to (i−1).

Here, in the case where the data storage unit 25 stores the input tuple set S illustrated in FIG. 20; the threshold value τ is "2"; the data identifier is "S"; and the join key attribute is "product number," the SIP tuple of the tuple s with the tuple identifier of "101" is generate in the following manners. In this case, the join key string in tuple s is "XWY-RS200."

SIP tuple (i=1): <"XWY-RS200", 0, "S: 101">
SIP tuple (i=2): <"WY-RS200", 1, "S: 101">
SIP tuple (i=3): <"Y-RS200", 2, "S: 101">

In the case of another mode of the SIP tuple, more specifically, in the case where the combination of the head portion string ranging from the head character to the i-th character counted from the tail character, the string length of the remaining tail portion string, and the tuple pointer is used, the SIP tuple in the above-described example is generated in the following manners.

SIP tuple (i=1): <"XWY-RS200", 0, "S: 101">
SIP tuple (i=2): <"XWY-RS20", 1, "S: 101">
SIP tuple (i=3): <"XWY-RS2", 2, "S: 101">

It should be noted that any of the two methods may be employed as the mode of the SIP tuple. As described above, the SIP tuple is a tuple containing information on the join key, and hence, can be called a key information tuple. Further, the SIP tuple generating unit 21 can be called a key information generating unit.

The data distributing unit 22 receives the SIP tuple set generated by the SIP tuple generating unit 21, determines the distribution destination of each of the SIP tuples, and distributes (transmits), as the data on each of the tuples, each of the SIP tuples to the join processing device 30 determined to be the distribution destination. The data distributing unit 22 determines the distribution destination of each of the SIP tuples on the basis of the head character of the tail portion string or the tail character of the head portion string contained in each of the SIP tuples. Then, the SIP tuples having the same head character or the same tail character are distributed to the same join processing device 30.

For example, the data distributing unit 22 determines the distribution destination of each of the SIP tuples using a function such as a hash function that, in response to input of one character, outputs one value with which any one of the join processing devices 30(#1), 30(#2), 30(#3), and 30(#4) can be identified. The data distributing unit 22 identifies a network address of the join processing device 30 serving as the determined distribution destination on the basis of the network address information contained in the execution instruction transmitted from the system controlling device 10, and transmits the corresponding SIP tuple to the join processing device 30. Note that the method of determining the distribution destination from a certain character is not limited to the method using the function such as the hash function.

Here, the head character of the tail portion string is any one of the characters contained in the end portion ranging from the head character to the (τ+1)th character in the join key string, and the tail character of the head portion string is any one of the characters contained in the end portion ranging from the tail character to the (τ+1)th character in the join key string. Thus, for the tuple s and the tuple r having at least one character common to each other contained in the end portion ranging from the head character or the tail character to the (τ+1)th character in the join key string, one or more pair of all the combinations (pairs) of (τ+1) pieces of SIP tuples related to the tuple s and (τ+1) pieces of SIP tuples related to the tuple r are distributed to the same join processing device 30, and are subjected to the similarity join process. Note that, in this exemplary embodiment, the tuple s and the tuple r that do not have any common character in the end portion may be distributed to the same join processing device 30, or may be distributed to different join processing devices 30. In any of the cases described above, the tuple s and the tuple r that do not have any common character in the end portion are excluded from the target of the similar join process in the join processing device 30.

[Join Processing Device]

Figure 4:
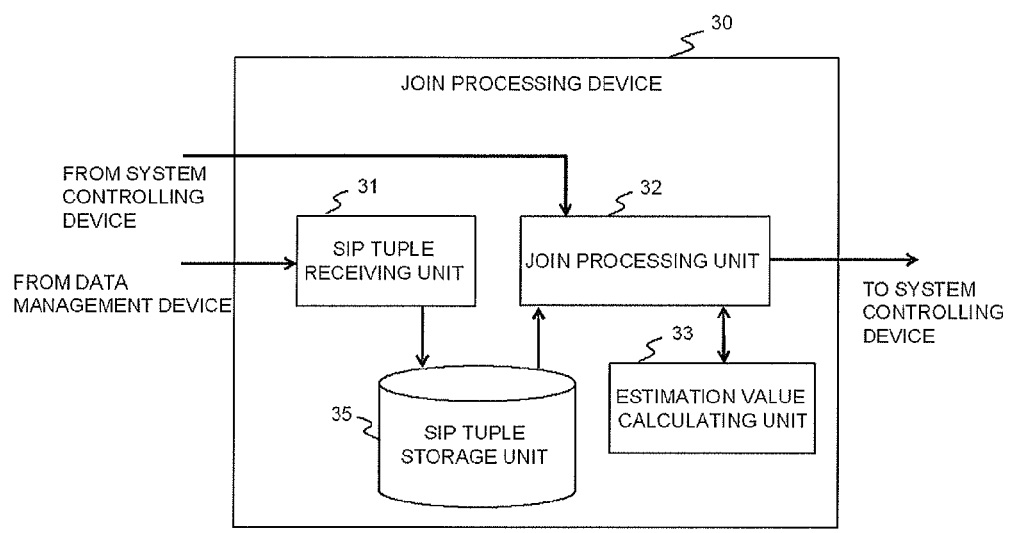
FIG. 4 is a block diagram schematically illustrating a configuration example of a join processing device.

FIG. 4 is a block diagram schematically showing a configuration example of the join processing device 30. As illustrated in FIG. 4, the join processing device 30 includes, for example, a SIP tuple receiving unit 31, a join processing unit 32, an estimation value calculating unit 33, and an SIP tuple storage unit 35. The SIP tuple receiving unit 31, the join processing unit 32, and the estimation value calculating unit 33 are realized, for example, with the CPU running a program stored in the memory. Further, the SIP tuple storage unit 35 is realized, for example, on the memory.

The SIP tuple receiving unit 31 receives the SIP tuple transmitted from the data management device 20, and stores the received SIP tuple in the SIP tuple storage unit 35. The SIP tuple storage unit 35 stores a set of the SIP tuples received by the SIP tuple receiving unit 31. The SIP tuple storage unit 35 stores, as one set, the SIP tuples having the common head character of the tail portion string or common tail character of the head portion string contained in each of the SIP tuples.

The join processing unit 32 receives the execution instruction transmitted from the system controlling device 10, and retains various kinds of data contained in the execution instruction. As described above, the various kinds of data includes, for example, a data identifier, a threshold value τ, a network address information such as an IP address of the data management device 20, and a network address information such as an IP address of the system controlling device 10.

The join processing unit 32 uses the retained data as described above to perform the similarity join process for the SIP tuples stored in the SIP tuple storage unit 35. More specifically, the join processing unit 32 extracts, from the SIP tuple storage unit 35, a set of given SIP tuples having a common head character of the tail portion string or a common tail character of the head portion string, and causes the estimation value calculating unit 33 to perform a predetermined process for all the combinations (all the pairs) of two SIP tuples in the plural SIP tuples having the common head character of the tail portion string or the common tail character of the head portion string extracted above. Here, in the case where the similarity join process is directed to the join between different tuple sets (data), the join processing unit 32 causes the estimation value calculating unit 33 to perform the predetermined process for all the combinations (all the pairs) of two SIP tuples, the two SIP tuples having data identifiers different from each other, in the plural SIP tuples having the common head character of the tail portion string or the common tail character of the head portion string extracted above. The data identifier is extracted from the tuple pointer contained in the SIP tuple. With these configurations, even if the tuple s and the tuple r that do not have any common character in the end portion ranging from the head character or the tail character to the (τ+1)th character in the join key string are distributed to the same join processing device 30, they are excluded from the target of the similarity join process.

The join processing unit 32 acquires the process results from the estimation value calculating unit 33, and identifies, on the basis of the acquired process results, the pair of the SIP tuples having the edit distance estimated to satisfy the condition of the threshold value τ. As for the process results of the estimation value calculating unit 33, information indicating whether or not the local edit distance concerning each of the pairs of the SIP tuples and its edit distance satisfy the condition of the threshold value τ is acquired. The join processing unit 32 generates a local result tuple containing the pair of the tuple pointer and the local edit distance for each of the identified pairs, and transmits the local join result containing the generated local result tuple to the system controlling device 10.

Upon receiving the pair of SIP tuples (two SIP tuples) from the join processing unit 32, the estimation value calculating unit 33 calculates the edit distance between tail portion strings or head portion strings contained in each of the SIP tuples. The calculated edit distance is denoted as a partial string edit distance. In the case where the calculated partial string edit distance does not satisfy the condition of the threshold value τ, the estimation value calculating unit 33 sends back, to the join processing unit 32, the process results indicating that the edit distance of the pair of the SIP tuples does not satisfy the condition of the threshold value τ.

On the other hand, in the case where the calculated partial string edit distance satisfies the condition of the threshold value τ, the estimation value calculating unit 33 further calculates a local edit distance of the pair by adding the partial string edit distance to the string length of the larger head portion string or the string length of the larger tail portion string. The estimation value calculating unit 33 compares the calculated local edit distance with the threshold value τ, and returns the comparison result serving as the process results to the join processing unit 32. More specifically, in the case where the local edit distance satisfies the condition of the threshold value τ, the estimation value calculating unit 33 returns, as the process results, the local edit distance and the information indicating that the edit distance of the pair of the SIP tuples satisfies the condition of the threshold value τ. On the other hand, in the case where the local edit distance does not satisfy the condition of the threshold value τ, the estimation value calculating unit 33 returns the process results indicating that the edit distance of the pair of the SIP tuples does not satisfy the condition of the threshold value τ.

Next, a description will be made of a relationship between the local edit distance calculated using the partial string edit distance as described above and a normal edit distance (hereinafter, referred to as an actual edit distance) calculated using the entire join key string. A head portion string ranging from the head character to the i−1th character in a join key string of a tuple x is denoted as $xh\_i$, a head portion string ranging from the head character to j−1th character in a tuple y is denoted as $yh\_i$, and the remaining tail portion strings are denoted as $xt\_i$ and $yt\_j$, respectively.

The following relationship is formed among an edit distance $ED(x, y)$ of the tuple x and the tuple y, an edit distance (partial string edit distance) $ED(xh\_i, yh\_j)$ between the head portion strings, and the edit distance (partial string edit distance) ED(xt_i, yt_j) between the tail portion strings.

$$ED(x,y) \leq ED(xh\_i, yh\_j) + ED(xt\_i, yt\_j) \qquad \text{Equation 1}$$

Further, the following relationship is formed between ED(x, y) and the string lengths |x| and |y| of the join key. Note that the max( ) is a function that outputs the larger value.

$$ED(x,y) \leq \max(|x|, |y|) \qquad \text{Equation 2}$$

On the basis of the Equation 1 and Equation 2 described above, the following Equation 3 and Equation 4 can be obtained.

$$ED(x,y) \leq \max(|xh\_i|, |yh\_j|) + ED(xt\_i, yt\_j) \qquad \text{Equation 3}$$

$$ED(x,y) \leq \max(|xt\_i|, |yt\_j|) + ED(xh\_i, yh\_j) \qquad \text{Equation 4}$$

The right-hand sides of Equation 3 and Equation 4 correspond to the local edit distance calculated by the estimation value calculating unit 33 using the partial string edit distance. For the tuple x and the tuple y, $\{2 \times (\tau+1)\}$ pieces of the SIP tuples are generated, and hence, plural pieces of the local edit distances for the tuple x and the tuple y may be generated. All the plural local edit distances generated are not always equal to the actual edit distance. This is because, as shown in Equation 3 and Equation 4, the local edit distance only indicates the upper limit value of the actual edit distance. Thus, the local edit distance may be called an edit distance estimation value. On the basis of Equation 3 and Equation 4 described above, the following relationships can be formed.

If $\max(|xh\_i|, |yh\_j|) + ED(xt\_i, yt\_j) \leq \tau$ is established, $ED(x, y) \leq \tau$ Equation 5, where i is not less than 1 and not more than $\tau+1$ If $\max(|xt\_i|, |yt\_j|) + ED(xh\_i, yh\_j) \leq \tau$ is established, $ED(x, y) \leq \tau$ Equation 6, where j is not less than 1 and not more than $\tau+1$ On the basis of the relationships Equation 5 and Equation 6 described above, it can be understood that the actual edit distance is always less than or equal to $\tau$ if the local edit distance of the tuple x and the tuple y is less than or equal to the threshold value $\tau$. Further, on the basis of the general characteristics of the edit distance, it can be derived that, if the actual edit distance is less than or equal to the threshold value $\tau$, the minimum local edit distance of the plural local edit distance of the tuple x and the tuple y is always equal to the actual edit distance.

Those described above can be expressed using the following theorem: if the edit distance ED(x, y) between the given strings x and y is less than or equal to the edit distance threshold value $\tau$, then at least one pair <i, j> of positive integers that satisfy the following condition exists.

$(1 \leq i \leq \tau+1)$ AND $(1 \leq j \leq \tau+1)$ AND $(x[i]=y[j])$ AND $\{\max(|xh\_i, yh\_j|) + ED(xt\_i, yt\_j) = ED(x,y)\}$, or $(0 \leq |xs|-i+1 \leq \tau+1)$ AND $(0 \leq |ys|-j+1 \leq \tau+1)$ AND $(x[i-1]=y[j-1])$ AND $\{\max(|xt\_i, yt\_j|) + ED(xh\_i, yh\_j) = ED(x,y)\}$ Here, xt_i indicates a tail portion string ranging from the tail character to the i-th character counted from the head character in the string x; |xh_i| indicates a string length of the remaining head portion string; yt_j indicates a tail portion string ranging from the tail character to the j-th character counted from the head character in the string y; and |yh_j| indicates a string length of the remaining head portion string. Further, x[i] indicates the i-th character counted from the head character in the string x; y[j] indicates the j-th character counted from the head character in the string y; |xs| indicates the string length of the string x; and |ys| indicates the string length of the string y.

From the theorem described above, it is guaranteed that, if the actual edit distance is less than or equal to the threshold value $\tau$, the minimum local edit distance of the plural local edit distance of the tuple x and the tuple y generated from the SIP tuples is always equal to the actual edit distance. There is a possibility that, for the tuple x and the tuple y, plural local edit distances are generated, and hence, there may exist plural local edit distances having a value less than or equal to the threshold value $\tau$. However, the result generating unit 12 of the system controlling device 10 filters the local result tuples using the local edit distance as described above, so that the actual edit distance can be readily known on the basis of the local edit distance. Thus, as described in this exemplary embodiment, even if the similarity join result is obtained using the local edit distance in place of the actual edit distance, it is possible to obtain the correct similarity join result.

[Example of Operation]

Next, an example of an operation performed by the system 1 according to the third exemplary embodiment will be described.

Figure 5:
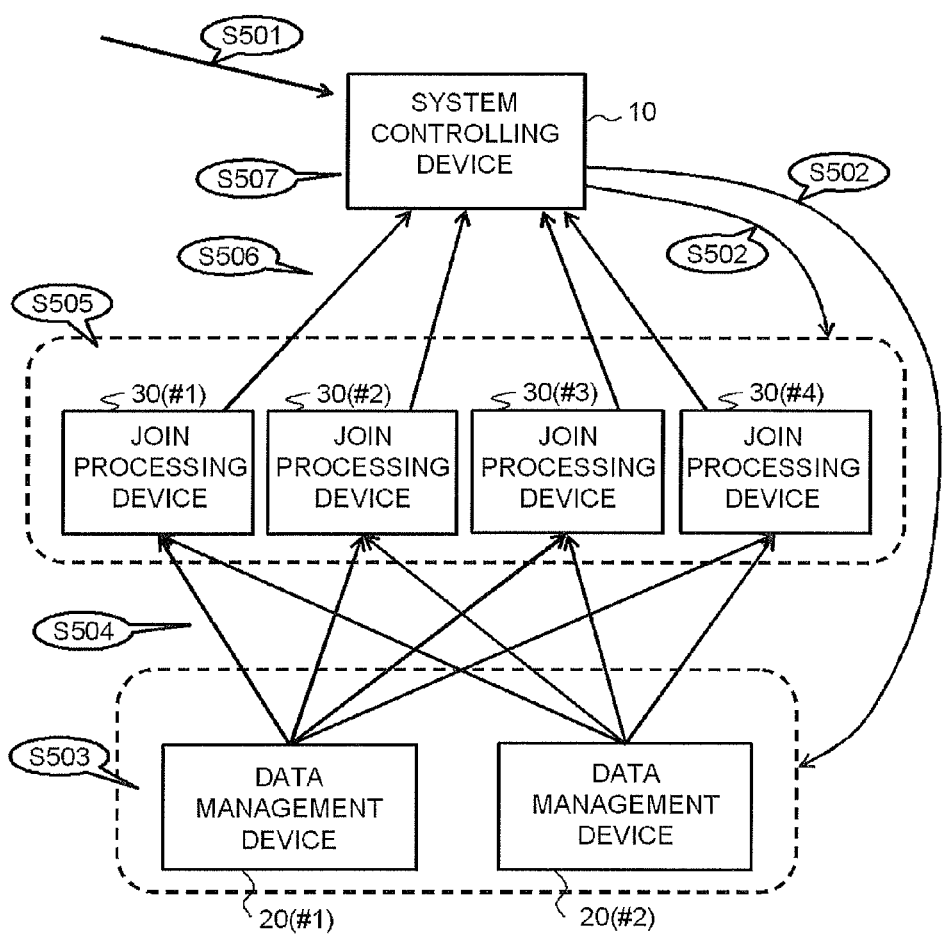
FIG. 5 is a diagram schematically illustrating the entire operation performed by the string similarity join system according to the third exemplary embodiment.

FIG. 5 is a diagram illustrating an overview of an entire operation performed by the system 1 according to the third exemplary embodiment.

First, in the system controlling device 10, the request controlling unit 11 acquires a processing request for the string similarity join (S501). This processing request includes a data identifier (for example, S and R) for identifying data serving as the join process target, information (for example, "product number") on an join key attribute of the target data, and an edit distance threshold value $\tau$.

The request controlling unit 11 generates an execution instruction on the basis of details of the processing request acquired, and transmits the generated execution instructions to all the data management devices 20 and all the join processing devices 30 (S502).

Each of the data management devices 20 that receives the execution instruction operates in the following manners. The SIP tuple generating unit 21 extracts data corresponding to the data identifier contained in the execution instruction from the data storage unit 25, and generates ($\tau+1$) pieces of SIP tuples for each of the tuples contained in the extracted data (S503).

Next, the data distributing unit 22 receives a SIP tuple set generated by the SIP tuple generating unit 21, identifies the join processing device 30 serving as the distribution destination of each of the SIP tuples, and distributes each of the SIP tuples to the identified join processing device 30 (S504).

Each of the join processing devices 30 that receives each of the SIP tuples operates in the following manners. The SIP tuple receiving unit 31 receives the SIP tuples transmitted from the data management device 20, and sequentially stores the received SIP tuples in the SIP tuple storage unit 35. Once all the data management devices 20 serving as the target complete the distribution, each of the join processing devices 30 entirely acquires all the SIP tuples serving as the join process target.

The join processing unit 32 performs the similarity join process for the SIP tuples stored in the SIP tuple storage unit 35 (S505). In this similarity join process, a partial string edit distance is calculated for the pairs of the SIP tuples, and a local edit distance is calculated on the basis of the partial string edit distance. Then, the pairs of SIP tuples having an edit distance estimated to satisfy the condition of a threshold value τ are identified.

The join processing unit 32 generates a local result tuple containing pairs of tuple pointer and the local edit distance for each of the identified pairs, and transmits local join results containing the generated local result tuple to the system controlling device 10 (S506).

In the system controlling device 10 that receives the local join results from each of the join processing devices 30, the result generating unit 12 excludes all the local result tuples having pairs of the same tuple pointers except for those having the minimum local edit distance, and stores the local result tuples in the join result storage unit 15 (S507). Then, from the local result tuples stored in the join result storage unit 15 of the system controlling device 10, it is possible to obtain information on the pair of tuples that satisfy the condition of the edit distance threshold value τ.

Next, of the steps shown in FIG. 5, operations of S503, S505, and S507 will be described in detail. Described below is an example of an operation performed by the data management device 20(#1) in which the data management device 20(#1) retaining an input tuple set (data) S in FIG. 20 receives, from the system controlling device 10, an execution instruction in which data identifiers (S and R) are set as the join process target, "product number" is set as the join key attribute, and "2" is set as the threshold value τ.

Figure 6:
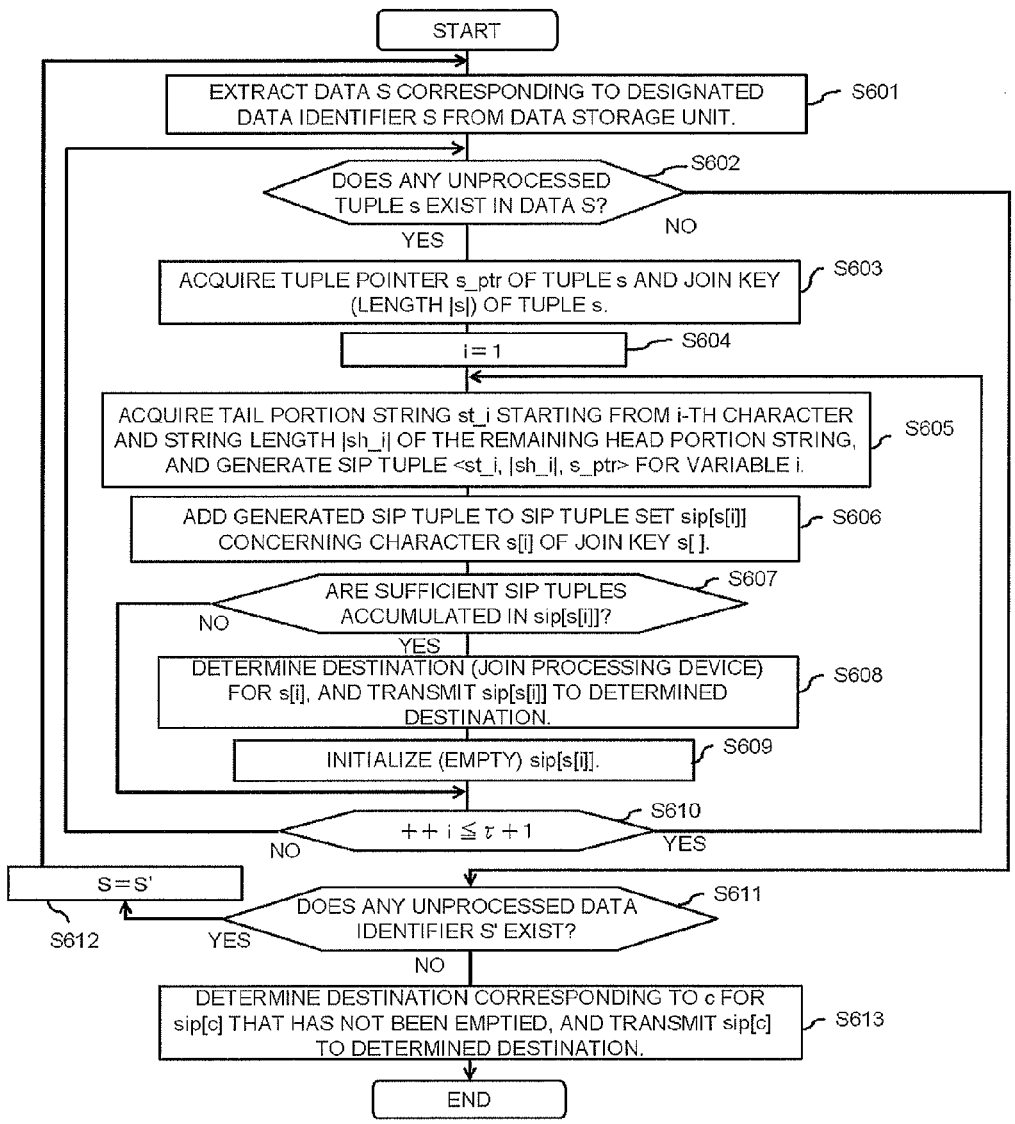
FIG. 6 is a flowchart showing an example of an operation performed by a data management device according to the third exemplary embodiment.

FIG. 6 is a flowchart showing an example of an operation performed by the data management device 20 according to the third exemplary embodiment. FIG. 6 shows details of operations in S503 described above.

First, the SIP tuple generating unit 21 extracts, from the data storage unit 25, data S corresponding to a data identifier S contained in an execution instruction from the system controlling device 10 (S601). In FIG. 20, the data S containing four tuples having tuple identifiers (TID) of 101 to 104 are extracted by the SIP tuple generating unit 21 of the data management device 20(#1).

The SIP tuple generating unit 21 judges whether the data S contains an unprocessed tuple s (S602). If the unprocessed tuple s exists (S602; YES), the SIP tuple generating unit 21 acquires a tuple pointer s_ptr and a join key (string length: |s|) for the tuple s (S603). In the example illustrated in FIG. 20, if a tuple having the tuple identifier (TID) of 101 is not processed, the tuple pointer s_ptr to be acquired is "S: 101," and the join key to be acquired is "XWY-RS200."

The SIP tuple generating unit 21 sets the initial value 1 to a variable i (S604).

The SIP tuple generating unit 21 acquires a tail portion string st_i ranging from a tail character to the i-th character counted from a head character in the join key, and a string length |sh_i| of the remaining head portion string (S605). Here, the string length of the tail portion string st_i is (|s|−i+1), and the |sh_i| is indicated as (i−1). The SIP tuple generating unit 21 uses the acquired data to generate a SIP tuple <st_i, |sh_i|, s_ptr> for the variable i (S605).

Then, the SIP tuple generating unit 21 adds the generated SIP tuple to a SIP tuple set sip[s[i]] concerning a character s[i] (S606). The character s[i] corresponds to the i-th character counted from the head character in the join key s[ ] (for example, "XWY-RS200"), in other words, corresponds to the head character of the tail portion string st_i. Thus, the SIP tuple set sip[s[i]] is a set of SIP tuples having the head character of the tail portion string st_i common to each other.

Next, the SIP tuple generating unit 21 judges whether the sip[s[i]] sufficiently accumulates the SIP tuples (for example, 10 pieces of SIP tuples) (S607). If the sufficient number of SIP tuples are not accumulated (S607; NO), the SIP tuple generating unit 21 judges whether or not a value (++i) obtained by adding one to the variable i is less than or equal to (τ+1) (S610). If the (++i) is less than or equal to (τ+1) (S610; YES), the SIP tuple generating unit 21 performs the processes S605 and S606 described above for the variable i having one added thereto. After this, the SIP tuple generating unit 21 repeats the processes S605 and S606 described above until the (++i) exceeds (τ+1).

FIG. 7 is a schematic view illustrating an example of generating the SIP tuple. FIG. 7 illustrates a SIP tuple generated through the processes described above in connection with the tuple (101) contained in the data S in the example illustrated in FIG. 20. The tuple (101) represents a tuple having a tuple identifier (TID) of 101. In FIG. 7, the first line indicates a SIP tuple generated in the case where the variable i is 1; the second line indicates a SIP tuple generated in the case where the variable i is 2; and the third line indicates a SIP tuple generated in the case where the variable i is 3. Then, each of the SIP tuples is added to SIP tuple sets sip["X"], sip["W"], and sip["Y"], respectively.

If sufficient numbers of SIP tuples are accumulated (S607; YES), the SIP tuple generating unit 21 notifies the data distributing unit 22 to that effect. With this operation, the data distributing unit 22 determines the distribution destination of the SIP tuple set sip[s[i]] serving as the target of the notification (S608). For example, the data distributing unit 22 determines the join processing device 30 corresponding to a hash value obtained by applying the character s[i] to a predetermined hash function, to be the distribution destination.

FIG. 8 is a diagram illustrating an example of input-and-output of a hash function used for determining the distribution destination. In the example illustrated in FIG. 8, the hash values (00, 01, 10, 11) outputted are associated in advance with join processing devices 30(#1), 30(#2), 30(#3), and 30(#4), respectively. In this example, for the SIP tuple set sip["X"], the join processing device 30(#1) associated with the hash value (00) is determined to be the distribution destination; for the SIP tuple set sip["Y"], the join processing device 30(#2) associated with the hash value (01) is determined to be the distribution destination; for the SIP tuple set sip["Z"], the join processing device 30(#3) associated with the hash value (10) is determined to be the distribution destination; and for the SIP tuple set sip["W"], the join processing device 30(#4) associated with the hash value (11) is determined to be the distribution destination. Note that, for the method of determining a certain distribution destination on the basis of a character, it may be possible to employ other known methods.

The data distributing unit 22 transmits the SIP tuple set sip[s[i]] to the join processing device 30 serving as the distribution destination determined on the basis of the head character (s[i]) of the tail portion string st_i as described above (S608). If the transmission is successfully made, the data distributing unit 22 initializes (empties) the SIP tuple set sip[s[i]] (S609).

If (++i) exceeds (τ+1) (S610; NO), the SIP tuple generating unit 21 judges again whether the data S contains any unprocessed tuple s (S602). If the unprocessed tuple s exists (S602; YES), the process S603 and thereafter are performed for the unprocessed tuple s in a similar manner described above. In the example illustrated in FIG. 20, SIP tuples are generated for the tuple (101), the tuple (102), the tuple (103), and the tuple (104) of the input tuple set S.

If no unprocessed tuple s exists (S602; NO), the SIP tuple generating unit 21 judges whether there exists any unprocessed data identifiers (S') contained in the execution instruction (S611). If there exists any unprocessed data identifier (S') (S611; YES), the data identifier S' is set to the data identifier S (S612), and then, the process S601 and thereafter are performed in the manners described above.

If it is determined that there exists no unprocessed other data identifier contained in the execution instruction (S611; NO), the SIP tuple generating unit 21 requests the data distributing unit 22 to transfer the SIP tuple set sip[c] that has not been initialized (not emptied). In response to this request, the data distributing unit 22 determines the distribution destination of the SIP tuple set sip[c] that has not been emptied (S613), and transmits the SIP tuple set sip[c] to the join processing device 30 serving as the determined distribution destination (S613).

Figure 20:
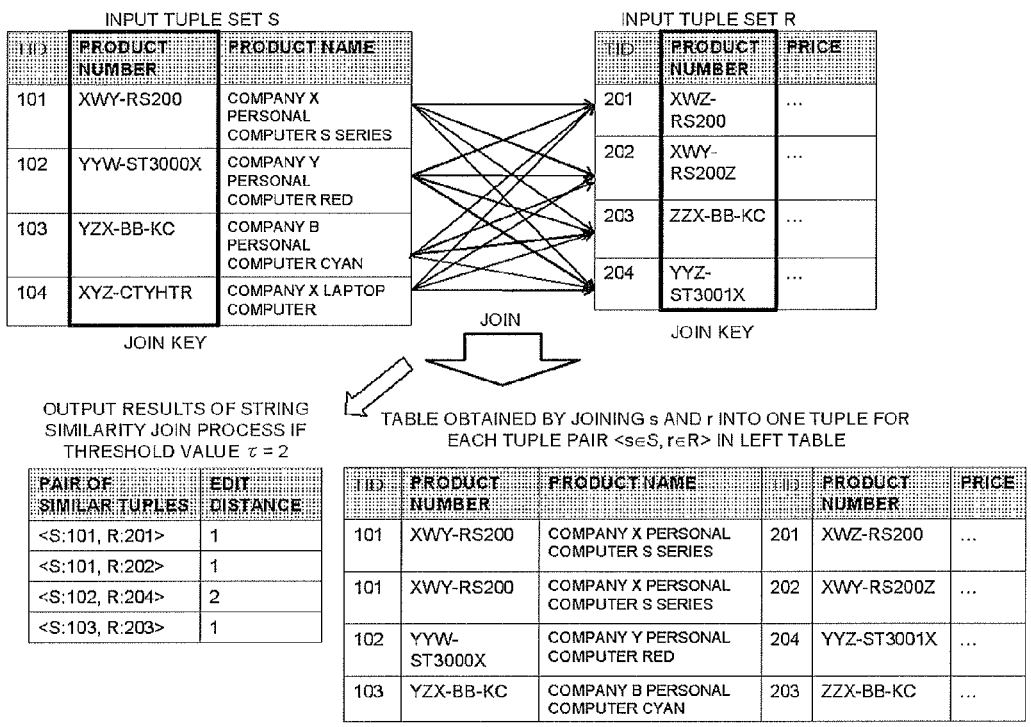
FIG. 20 is a schematic view illustrating an example of a string similarity join employing an edit distance.

Once the processes performed by each of the data management devices 20 as described above complete, each of the SIP tuples related to the input tuple sets (data) S and R illustrated in FIG. 20 is distributed to each of the join processing devices 30 as in the examples illustrated in FIG. 9A, FIG. 9B, FIG. 9C, and FIG. 9D. FIG. 9A, FIG. 9B, FIG. 9C, and FIG. 9D are diagrams each illustrating an example of distribution of the SIP tuples concerning the input tuple sets S and R illustrated in FIG. 20. FIG. 9A illustrates a SIP tuple set sip["X"]; FIG. 9B illustrates a SIP tuple set sip["Y"]; FIG. 9C illustrates a SIP tuple set sip["Z"]; and FIG. 9D illustrates a SIP tuple set sip["W"]. In the example illustrated in FIG. 8, the SIP tuple set illustrated in FIG. 9A is distributed to the join processing device 30(#1); the SIP tuple set illustrated in FIG. 9B is distributed to the join processing device 30(#2); the SIP tuple set illustrated in FIG. 9C is distributed to the join processing device 30(#3); and the SIP tuples set illustrated in FIG. 9D is distributed to the join processing device 30(#4).

Figure 10:
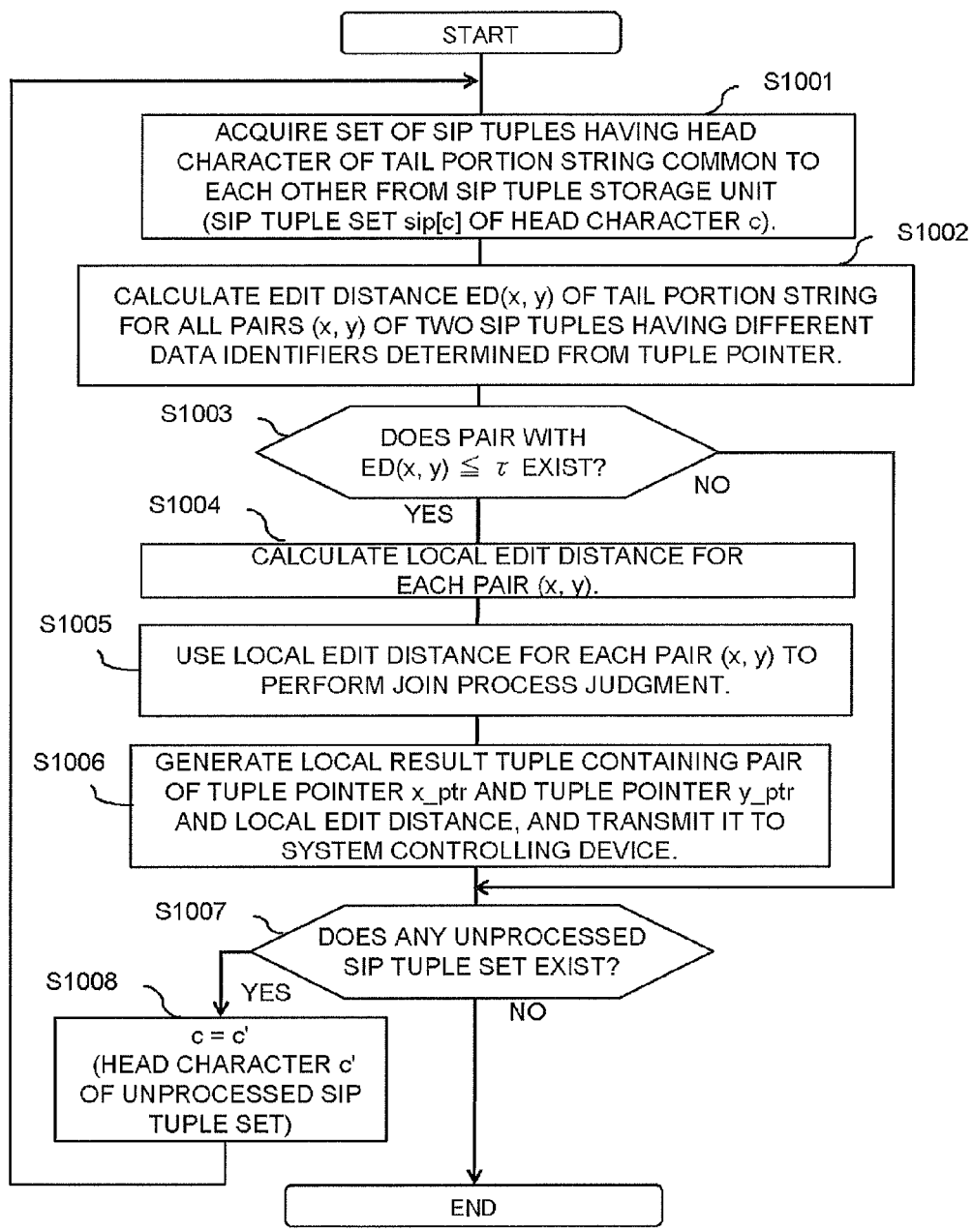
FIG. 10 is a flowchart showing an example of an operation performed by a join processing device according to the third exemplary embodiment.

FIG. 10 is a flowchart showing an example of an operation performed by the join processing device 30 according to the third exemplary embodiment. FIG. 10 shows details of the operation in S505. After each of the data management devices 20 completes distributing all the SIP tuples with the data identifier serving as the processing target contained in the execution instruction, each of the join processing devices 30 performs the processes shown in FIG. 10.

Below, an example of an operation performed by the join processing device 30(#1) will be described as an example using the join processing device 30(#1) having the SIP tuple set in FIG. 9A distributed thereto. In this case, in the join processing device 30(#1), the SIP tuple storage unit 35 stores the SIP tuple set illustrated in FIG. 9A.

The join processing unit 32 extracts a set of SIP tuples having the head character of the tail portion string common to each other from the SIP tuple storage unit 35 (S1001).

The join processing unit 32 transmits, to the estimation value calculating unit 33, information indicating all the pairs (x, y) of two SIP tuples having different data identifiers determined on the basis of the tuple pointer from the extracted SIP tuple set, and a processing instruction. The estimation value calculating unit 33 calculates an edit distance ED(x, y) of the tail portion string for all the pairs (x, y) of the SIP tuples on the basis of the information transmitted from the join processing unit 32 (S1002). It is only necessary that the edit distance ED(x, y) is calculated using generally known method of calculating the edit distance.

The estimation value calculating unit 33 judges whether or not the calculated partial string edit distances are less than or equal to the threshold value $\tau$ (S1003), and calculates the local edit distance for the pairs (x, y) having the partial string edit distance less than or equal to the threshold value $\tau$ (S1003; YES, S1004).

Here, by denoting the local edit distance for each of the pairs (x, y) as LED(x, y), the expression for calculating the local edit distance can be given as Equation 7 below.

$$LED(x,y)=ED(xt\_i, yt\_i)+\max(|xh\_i|,|yh\_i|) \quad \text{Equation 7}$$

Further, the estimation value calculating unit 33 uses the calculated local edit distance to perform a join process judgment for each of the pairs (x, y) having the partial string edit distance less than or equal to the threshold value $\tau$ (S1005). The join process judgment is to judge whether or not the local edit distance is less than or equal to the threshold value $\tau$. In other words, judgment of following Equation 8 is made.

$$LED(x,y) \leq \tau \quad \text{Equation 8}$$

In the example illustrated in FIG. 9A, an example of an operation performed by the estimation value calculating unit 33 in the case of a pair of a SIP tuple (S: 103) having the tuple identifier "S: 103" and a SIP tuple (R: 203) having the tuple identifier "R: 203" can be given as below. The tail portion string (xt_i) of the tuple (S: 103) is "X-BB-KC," and the tail portion string (yt_i) of the tuple (R: 203) is "X-BB-KC." Further, the string length (|xh_i|) of the head portion string of the tuple (S: 103) is "2," and the string length (|yh_i|) of the head portion string of the tuple (R: 203) is "2."

In this case, the estimation value calculating unit 33 calculates "0" (zero) for the partial string edit distance of the pair of the tuple (S: 103) and the tuple (R: 203). Since the partial string edit distance (0) is less than or equal to the threshold value $\tau$ (2), the estimation value calculating unit 33 adds the partial string edit distance (0) to the string length (2) of the larger head portion string to calculates the local edit distance (2). The expression at this time can be given as Equation 9 below.

$$LED(S:103,R:203)=ED(\text{"X-BB-KC"},\text{"X-BB-KC"})+\max(2,2)=0+2=2 \quad \text{Equation 9}$$

Since the calculated local edit distance (2) is less than or equal to the threshold value $\tau$ (2), the estimation value calculating unit 33 sets the results of the join process judgment to "true." Such an estimation value calculating unit 33 may be realized, for example, as one function (validation function). In this case, the validation function is configured so as to acquire an address for accessing a pair of SIP tuples, and return the local edit distance of the pair, and information indicating the results of the join process judgment.

The join processing unit 32 acquires the local edit distance and the results of the join process judgment as the processing results for each of the pairs of the SIP tuples from the estimation value calculating unit 33. The join processing unit 32 identifies pairs for which the results of the join process judgment are true, and generates a local result tuple containing a pair of tuple pointers and the local edit distance for each of the identified pairs (S1006).

The join processing unit 32 transmits the local join result containing the generated local result tuple to the system controlling device 10 (S1006).

After transmitting the local join result to the system controlling device 10 (S1006), or if it is determined that there exists no pair having the partial string edit distance less than or equal to the threshold value $\tau$ (S1003; NO), the join processing unit 32 judges whether any unprocessed other SIP tuple sets exist in the SIP tuple storage unit 35 (S1007).

If there exists no unprocessed SIP tuple set (S1007; NO), the join processing unit 32 terminates the process. On the other hand, if there exists the unprocessed SIP tuple set (S1007; YES), the join processing unit 32 sets the head character c' of the unprocessed SIP tuple to a variable c (S1008), and then, the process S1001 and thereafter are performed in a similar manner described above.

FIG. 11A is a diagram illustrating an example of a partial string edit distance, a local edit distance, and a local result tuple calculated on the basis of the SIP tuple set illustrated in FIG. 9A. FIG. 11B is a diagram illustrating an example of a partial string edit distance, a local edit distance, and a local result tuple calculated on the basis of the SIP tuple set illustrated in FIG. 9B. FIG. 11C is a diagram illustrating an example of a partial string edit distance, a local edit distance, and a local result tuple calculated on the basis of the SIP tuple set illustrated in FIG. 9C. FIG. 11D is a diagram illustrating an example of a partial string edit distance, a local edit distance, and a local result tuple calculated on the basis of the SIP tuple set illustrated in FIG. 9D. Note that blank columns in each table of FIG. 11A, FIG. 11B, FIG. 11C, and FIG. 11D indicate that no process is performed because the partial string edit distance exceeds the threshold value τ or the local edit distance exceeds the threshold value τ. In the example illustrated in FIG. 11A, three local result tuples are generated for nine pairs of SIP tuples.

Figure 12:
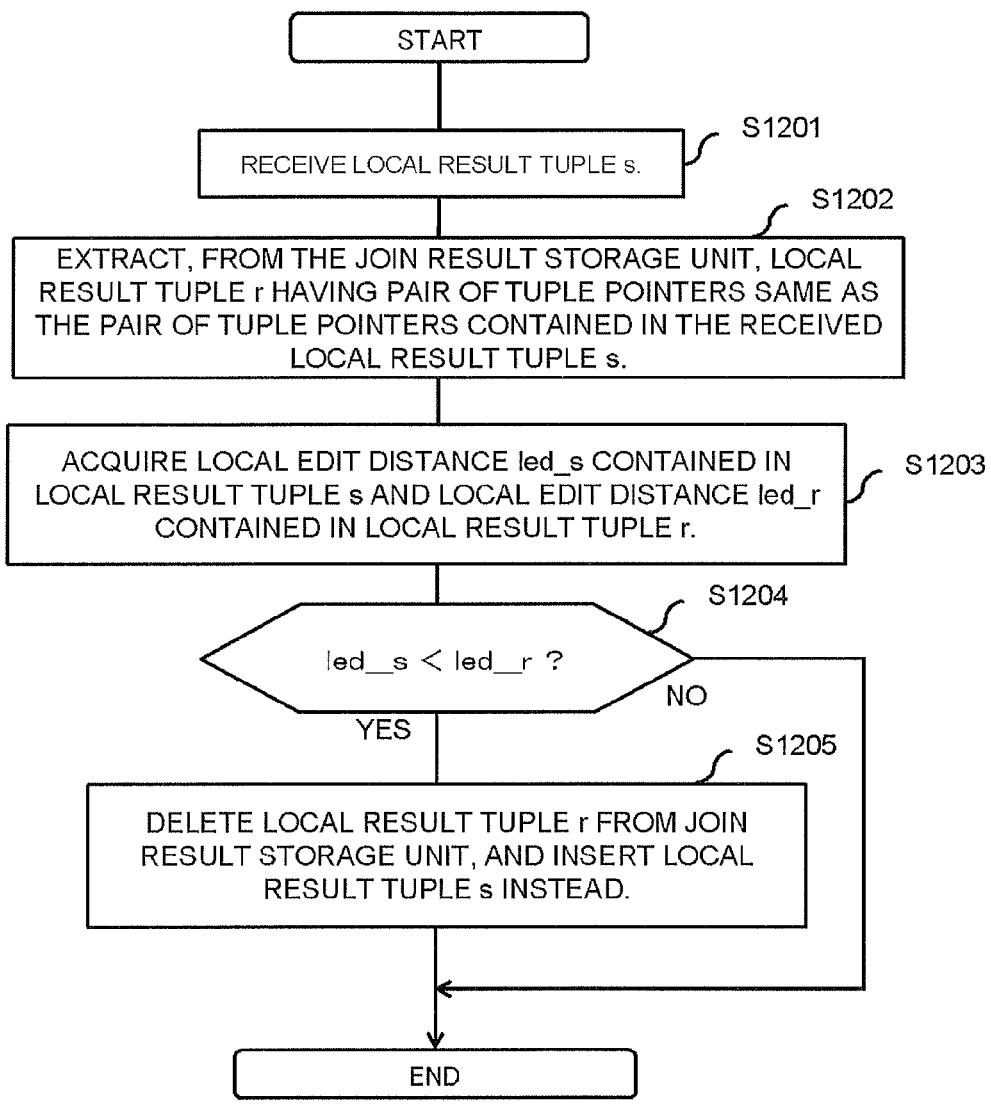
FIG. 12 is a flowchart showing an example of an operation performed by a system controlling device according to the third exemplary embodiment.

FIG. 12 is a flowchart showing an example of an operation performed by the system controlling device 10 according to the third exemplary embodiment. FIG. 12 shows details of operations in S507 described above.

The result generating unit 12 receives each of the local join results transmitted from each of the join processing devices 30 (S1201). Each of the local join results contains a local result tuple s.

The result generating unit 12 extracts, from the join result storage unit 15, a local result tuple r having the pair of tuple pointers same as the pair of tuple pointers contained in the received local result tuple s (S1202). Then, the result generating unit 12 acquires a local edit distance led_s contained in the received local result tuple s and a local edit distance led_r contained in the local result tuple r extracted from the join result storage unit 15 (S1203).

The result generating unit 12 judges whether the acquired local edit distance led_s is smaller than the local edit distance led_r acquired in a similar manner (S1204). If the local edit distance led_s is smaller than the local edit distance led_r (S1204; YES), the result generating unit 12 deletes the local result tuple r from the join result storage unit 15, and inserts the local result tuple s instead (S1205). If the local edit distance led_s is more than or equal to the local edit distance led_r (S1204; NO), the result generating unit 12 terminates without processing.

Here, in FIG. 11A, FIG. 11B, FIG. 11C, and FIG. 11D, plural local result tuples having the pair of tuple pointers common to each other exist. More specifically, the tuple pointer pair <S: 101, R: 201> is contained in the local result tuple <<S: 101, R: 201>, 1> in the first line of FIG. 11A and the local result tuple <<S: 101, R: 201>, 2> in the first line of FIG. 11D. Through the above described process performed by the system controlling device 10 in FIG. 12, such an overlapping local result tuple is removed.

FIG. 13 is a diagram illustrating an example of the final join process result obtained by the system controlling device 10. As illustrated in FIG. 13, for the overlapping local result tuples, only the local result tuple having the minimum local edit distance is left. With these operations, the local edit distance contained in the local result tuple that is finally left becomes equal to the actual edit distance described above.

This can be proven by comparing the table in FIG. 13 and the table at the left below in FIG. 20. From the comparison between the table in FIG. 13 and the table at the left below in FIG. 20, it can be understood that the results of the string similarity join process according to this exemplary embodiment matches the results of the existing string similarity join process in the case where the input data is set to the input tuple sets S and R in FIG. 20, and the join key attribute is set to the attribute of "product number." In other words, according to this exemplary embodiment, it is possible to appropriately perform the string similarity join using the edit distance.

It should be noted that, in the example of the operation described above, the configuration in which the SIP tuple is formed by the tail portion string, the string length of the remaining head portion string and the tuple pointer is given as an example. However, as described in [Device configuration], it may be possible to employ a configuration in which the SIP tuple is formed by a head portion string, a string length of the remaining tail portion string, and a tuple pointer. In the case of this configuration, the distribution destination of each of the SIP tuples is determined on the basis of the tail character of the head portion string, and the local edit distance is calculated by adding the edit distance between the head portion strings to the string length of the larger tail portion string.

[Operation and Effect of Third Exemplary Embodiment]

As described above, in the third exemplary embodiment, for the join key string of each of the tuples of data that the data management device 20 has, the data management device 20 generates (τ+1) pieces of SIP tuples each formed by a combination of the tail portion string ranging from the tail character to the i-th character (i is a positive integer less than or equal to (τ+1)) counted from the head character, the string length of the remaining head portion string, and the tuple pointer, or a combination of the head portion string ranging from the head character to the i-th character counted from the tail character, the string length of the remaining tail portion string, and the tuple pointer. Then, the join processing device 30 serving as the distribution destination of each of the SIP tuples is determined on the basis of the head character of the tail portion string of each of the SIP tuples or the tail character of the head portion string of each of the SIP tuples, and each of the SIP tuples is distributed to the determined join processing device 30.

With this configuration, in the third exemplary embodiment, for each of the tuples, (τ+1) pieces of the join processing devices 30 are selected for the distribution destination at the maximum. Thus, according to the third exemplary embodiment, it is possible to reduce the total amount of communication flowing in the network 7. More specifically, in the third exemplary embodiment, the entire processing cost of the system 1 is {τ×(m+n)}, regardless of the number N of the join processing devices 30, where m and n are the numbers of tuples contained in the input data S and the input data R. On the other hand, with the conventional method, the processing cost is (N×m+n). Thus, with the increase in the number N of the join processing devices 30 and the decrease in the threshold value τ, the third exemplary embodiment can further reduce the processing cost as compared with the conventional method.

Further, with the increase in the value of i, the data size of the SIP tuple is lower than the data size of the complete join key string. Thus, according to the third exemplary embodiment, it is possible to reduce the total communication amount as compared with the conventional method in which the complete join key string needs to be transferred to each of the join processing devices 30.

Further, with the third exemplary embodiment, the join processing device 30 calculates, for each of the pairs of the plural SIP tuples, the edit distance between the tail portion strings or the head portion strings serving as the partial string edit distance. Then, pairs of SIP tuples having the calculated partial string edit distance less than or equal to the threshold value τ are identified. For the identified pairs of SIP tuples, the partial string edit distance is added to the string length of the larger head portion string or the string length of the larger tail portion string to calculate the edit distance estimation value, and pairs of SIP tuples having the calculated edit distance estimation value less than or equal to the threshold value τ are identified.

Further, in the third exemplary embodiment, for the identified pairs of SIP tuples, the join processing device 30 generates the local result tuple containing the pair of tuple pointers and the local edit distance, and transmits the generated local result tuple to the system controlling device 10. The system controlling device 10 detects overlapping result tuples containing pairs of the same tuple pointers from among the plural local result tuples transmitted from the plural join processing devices 30, and delete all the detected overlapping result tuples except for the local result tuples having the minimum edit distance estimation value, thereby determining the pair of tuples having the edit distance less than or equal to the threshold value τ.

Thus, according to the third exemplary embodiment, the partial string edit distance is calculated, whereby it is possible to reduce the processing time as compared with the conventional method that calculates the edit distance of the complete join key string.

Further, when the distribution method as in the third exemplary embodiment is used, one or more join processing devices 30 always calculate the local edit distance LED(s, r) having the value equal to that of the actual edit distance ED(s, r) for the pair <s, r> of tuples, as described in the theorem described above, whereby the processing target data can be distributed in a manner such that the join process is performed for all the processing target without fail. Yet further, with the exclusion process for the overlapping local result tuple by the system controlling device 10, it is possible to obtain the appropriate join result of the string similarity join.

Fourth Exemplary Embodiment

A fourth exemplary embodiment is different from the third exemplary embodiment in the join process method performed by the join processing device 30. Below, a system 1 according to the fourth exemplary embodiment will be described with focus being placed on things different from the third exemplary embodiment, and the details same as the third exemplary embodiment will not be repeated.

Figure 14:
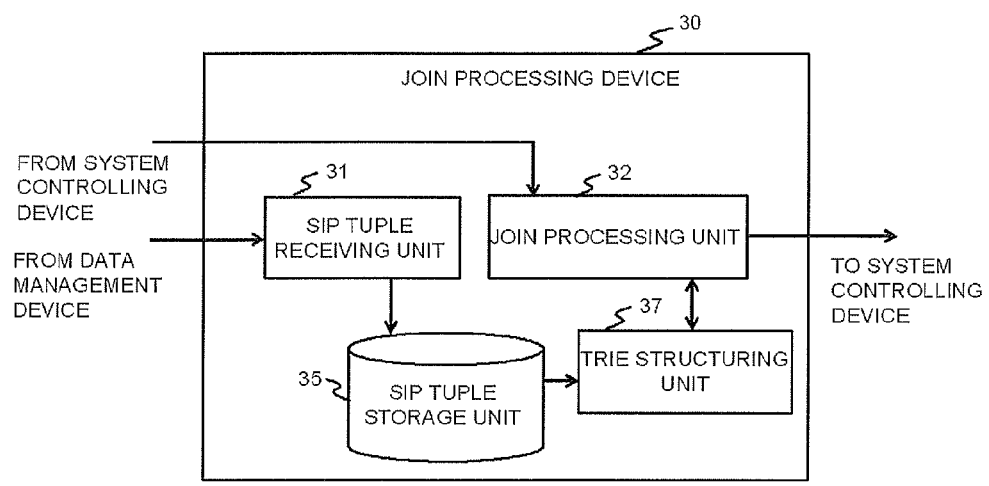
FIG. 14 is a block diagram schematically showing a configuration example of a join processing device according to a fourth exemplary embodiment.

FIG. 14 is a block diagram schematically showing a configuration example of a join processing device 30 according to the fourth exemplary embodiment. The join processing device 30 according to the fourth exemplary embodiment further includes a trie structuring unit 37 in place of the estimation value calculating unit 33 according to the third exemplary embodiment. Further, the process performed by the join processing unit 32 is different from that in the third exemplary embodiment.

The join processing unit 32 according to the fourth exemplary embodiment causes the trie structuring unit 37 to perform a process of structuring a trie of SIP tuples stored in the SIP tuple storage unit 35, and trace the structured trie to generate a local result tuple. As in the third exemplary embodiment, the join processing unit 32 transmits a local join result containing the local result tuple thus generated, to the system controlling device 10.

The trie has a structure similar to a patricia trie, and is formed on the memory of the join processing device 30. The trie structuring unit 37 extracts, from the SIP tuple storage unit 35, SIP tuple sets having the head character of the tail portion string or the tail character of the head portion string common to each other, and structures a trie having the extracted SIP tuple sets mapped therein. The trie structured by the join processing unit 32 has a structure capable of retaining information on the tail portion string (or head portion string), a string length of the head portion string (or string length of the tail portion string), and a tuple pointer, each of which constitutes the SIP tuples.

More specifically, in the trie, the tail portion strings (or head portion strings) of the SIP tuples are mapped to branches (path) from a root node to edge nodes (leaf nodes), and tuple pointers of the SIP tuples mapped to the branches together with a weight are attached to the edge nodes of the branches. Further, to the root node, the head character of the tail portion string or the tail character of the head portion string is attached as a label, and a list of pointers of child nodes together with a weight is attached. As for the weight used in this trie, the string length of the head portion string or the string length of the tail portion of the SIP tuple is used.

Figure 15:
FIG. 15 is a schematic view illustrating an example of a structure of a trie.
Figure 15:
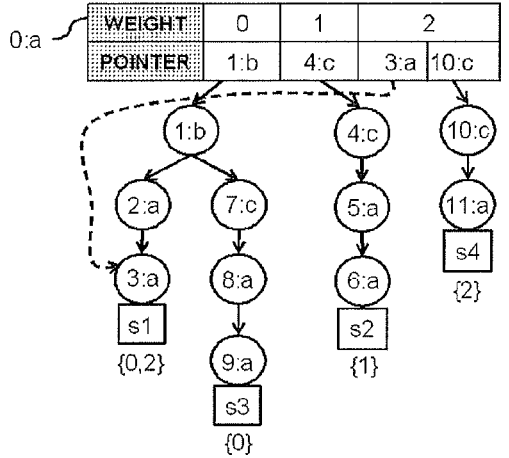

FIG. 15 is a schematic view illustrating an example of a structure of the trie. FIG. 15 shows an example of a trie (tree_a) structured for a set of SIP tuples containing a tail portion string (or head portion string) having a character "a" in a head character (or tail character). This SIP tuple set includes three types of string lengths (0, 1, 2) of head portion strings, and hence, three types of weights are set to the root node (0: a). A weight is associated with each of the child node pointers. Note that, in FIG. 15, each node is specified with a node number and a label attached to the node. For example, the node (2: a) represents a node having a node number of "2" and a label of character "a." Note that, in FIG. 15, the node number of the root node is set to 0. After this, each of the nodes is indicated by using only the node number.

In the example illustrated in FIG. 15, each branch and the SIP tuple have the following relationship.

The string "abaa" is mapped to the root node (0), the node (1), the node (2), and the node (3). The string "acaa" is mapped to the root node (0), the node (4), the node (5), and the node (6). The string "abcaa" is mapped to the root node (0), the node (1), the node (7), the node (8), and the node (9). The string "aca" is mapped to the root node (0), the node (10), and the node (11).

To the edge node (9), which is a branch having the string "abcaa" mapped thereto, the tuple pointer "s3" of the SIP tuple together with the string length "0" of the head portion string is attached. Similarly, to the edge node (6), the tuple pointer "s2" together with the string length "1" of the head portion string is attached, and to the edge node (11), the tuple pointer "s4" together with the string length "2" of the head portion string is attached.

The trie structuring unit 37 maps the tail portion string (or head portion string) of the SIP tuple having the same tuple pointer to one branch to suppress the amount of memory used. For example, since the string "abaa" and the string "aa" in FIG. 15 have the same tuple pointer "s1," the string "aa" is mapped to part of the branch having the string "abaa" mapped thereto. This is because one string forms the partial string of the other string. Thus, the string "aa" is mapped to the root node (0) and the node (3). At this time, a pointer "3:a" to the node (3) is set as the child node pointer of the weight "2" in the root node (0), and to the edge node (3), the tuple pointer "s1" together with the weight "0" and "2" is attached. Note that, in the case where the suppression of the amount of memory used is not necessary, it may be possible to map the tail portion strings (or head portion string) of the SIP tuples having the same tuple pointer to different branches.

After the trie structuring unit 37 completes structuring the trie, the join processing unit 32 searches the structured trie to acquire a set of local result tuples having the local edit distance less than or equal to the threshold value τ. The join processing unit 32 sequentially visits each nodes of the trie, and generates a list (active list) of other nodes analogous to each of the nodes, thereby acquiring the set of the local result tuple. In this exemplary embodiment, the active list stores node tuples containing a node number, a weight and a local edit distance in connection with each of the analogous other nodes. The searching process of the trie and the acquiring process of the local result tuple by the join processing unit 32 will be described later.

[Example of Operation]

Below, an example of an operation performed by the system 1 according to the fourth exemplary embodiment will be described. In this description, things different from that of the join process method performed by the join processing device 30 in the third exemplary embodiment will be described.

Figure 16:
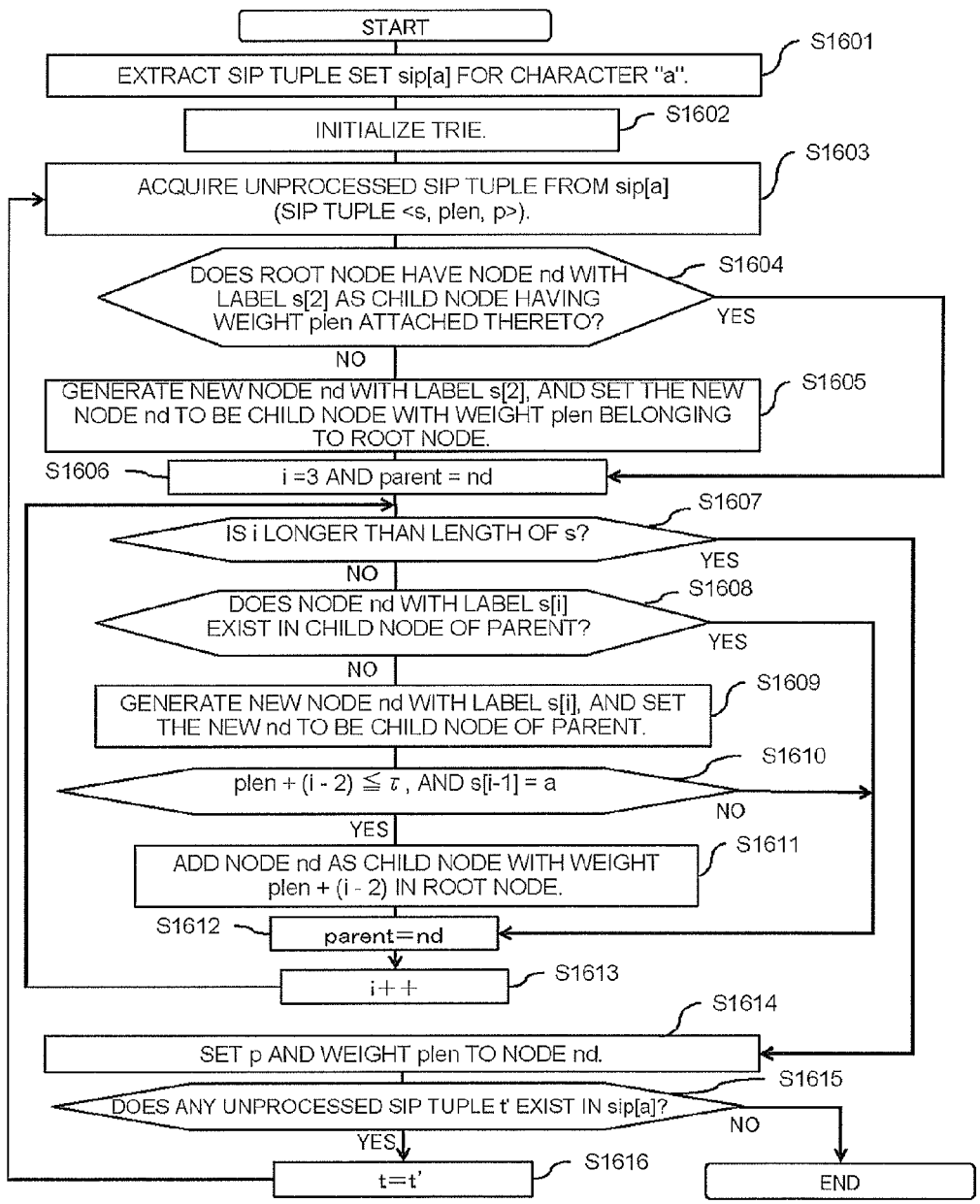
FIG. 16 is a flowchart showing an example of a structure process of the trie of the join processing device.

FIG. 16 is a flowchart showing an example of a process of structuring a trie performed by the join processing device 30.

The trie structuring unit 37 extracts, from the SIP tuple storage unit 35, a set of SIP tuples having the head character of the tail portion string common to each other (S1601). In the example illustrated in FIG. 16, a SIP tuple set sip[a] having the head character "a" is extracted. For instance, in the example illustrated in FIG. 15, a SIP tuple <"abaa", 0, s1> is extracted.

After the SIP tuple set sip[a] is extracted, the trie structuring unit 37 initializes the trie (S1602).

Then, the trie structuring unit 37 acquires unprocessed SIP tuples from the extracted SIP tuple set sip[a] (S1603). Here, the tail portion string contained in the SIP tuple is denoted as a string s, the string length of the remaining head portion string is denoted as a length plen, and the tuple pointer is denoted as p.

The trie structuring unit 37 judges whether the root node of the trie of the head character "a" has a node nd with a label s[2] as the child node having the weight plen attached thereto (S1604). In other words, the trie structuring unit 37 judges whether, in the root node, the pointer of the child node having the label of the character s[2] is set to the child node pointer having the weight plen (S1604). The character s[2] represents the second character counted from the head of the string s. In the example illustrated in FIG. 15, it is judged whether, in the root node (0), the pointer ("1: b") of the child node (node(1)) having the label of the character "b" (second character of "abaa") is set to the child node pointer having the weight (0).

If it is judged that such a child node exists (S1604; YES), the trie structuring unit 37 performs a process S1606. On the other hand, if it is judged that such a child node does not exist (S1604; NO), the trie structuring unit 37 newly generates a node nd with a label s[2], and sets the newly generated node nd to the child node with a weight plen in the root node (S1605). In the example in FIG. 15, the node (1) having a label "b" is generated, and the weight (0) and the child node pointer "1: b" is set to the root node.

The trie structuring unit 37 sets the variable i to be three, and sets the variable parent to be the node nd of the label s[2] (S1606).

Next, the trie structuring unit 37 repeats the processes from S1608 to S1613 described below until the variable i exceeds the length of the string s (S1607).

In the process S1608, the trie structuring unit 37 judges whether the node nd having the character s[i] set to the label thereof exists in the child nodes of the node having the variable parent set thereto. This judgment is made, for example, using the pointer of the child node contained in each of the nodes.

If node nd having the label s[i] already exists (S1608; YES), the trie structuring unit 37 sets the variable parent to be the node nd with the label s[i] (S1612), adds one to the variable i (S1613), and makes the judgment of S1607 again.

On the other hand, if the node nd with the label s[i] does not yet exist (S1608; NO), the trie structuring unit 37 newly generates the node nd with the label s[i], and sets the newly generated node nd for the child nod of the node having the variable parent set thereto (S1609). In the example illustrated in FIG. 15, the node (2) having the label "a" is generated, and the child node pointer "2: a" is set to the node (1).

Then, the trie structuring unit 37 judges whether there exists a SIP tuple containing the tail portion string that starts from the character s[i−1], which is the character immediately preceding the character s[i], and whether this character s[i−1] is equal to the label of the root node (S1610). More specifically, it is judged whether {plen+(i−2)≤τ} and (s[i−1]="a") are true as illustrated in FIG. 16. With this judgment, it is judged whether there exists any other SIP tuple that can be mapped to one branch.

If the SIP tuple containing the tail portion string that starts from the character s[i−1], which is a character immediately before the character s[i], exists and the character s[i−1] is equal to the label of the root node (S1610; YES), the trie structuring unit 37 adds a node nd as the child node with the weight (plen+(i−2)) of the root node (S1611). In other words, the trie structuring unit 37 sets the pointer of the node nd with the label s[i] together with the weight (plen+(i−2)) for this root node.

In the example illustrated in FIG. 15, in the process S1609 performed in the case where the string s is "abaa," the node (3) is generated, and in the process S1611, the child node pointer "3: a" together with the weight (2) is set to the root node. Thus, in this case, at the time when the SIP tuple having the string s of "aa" is set as the processing target, the link from the root node (0) to the node (3) has been already set. After this, the processes S1612 and S1613 described above are performed.

If the variable i is greater than the length of the string s (S1607; YES), in other words, if mapping of the string s to the trie completes, the trie structuring unit 37 sets the tuple pointer p together with the weight plen is set to the node nd (S1614). In the example illustrated in FIG. 15, the tuple pointer "s1" together with the weight (0) is set to the node (3), for example. Note that, in the case where the SIP tuple having the string s of "aa" is set to the processing target, the weight (2) is added as the weight of the tuple pointer "s1" set to the node (3).

Next, the trie structuring unit 37 judges whether there exists any unprocessed SIP tuple t' in the SIP tuple set sip[a] (S1615). If the unprocessed SIP tuple t' exists (S1615; YES), the trie structuring unit 37 sets t' for the variable t indicating the SIP tuple serving as the processing target (S1616), and then, performs the process S1603 and thereafter again. Note that, if no unprocessed SIP tuple t' exists (S1615; NO), the trie structuring unit 37 terminates its process.

Figure 17A:
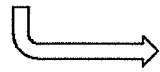
FIG. 17A is a schematic view illustrating an example of a structure of a trie concerning a letter "b."
Figure 17A:
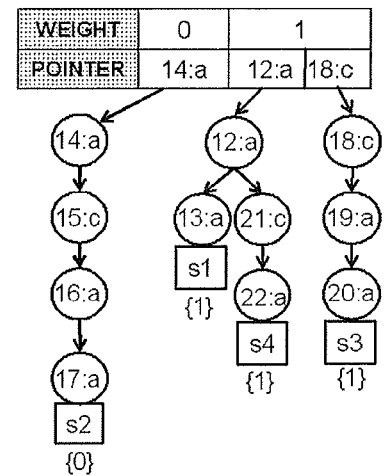
Figure 17B:
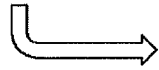
FIG. 17B is a schematic view illustrating an example of a structure of a trie concerning a letter "c."
Figure 17B:
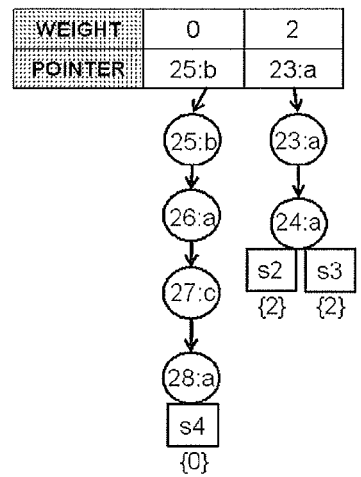

With the processed described above, the trie as illustrated in FIG. 15 is structured. If the set of the SIP tuples in which another character "b" is common to each of them and the set of the SIP tuples in which another character "c" is common to each of them are extracted from the SIP tuple storage unit 35 (S1601), the trie for the character "b" and the trie for the character "c" are structured, respectively. FIG. 17A and FIG. 17B are diagrams each illustrating an example of the tries for the character "b" and the character "c."

Figure 18:
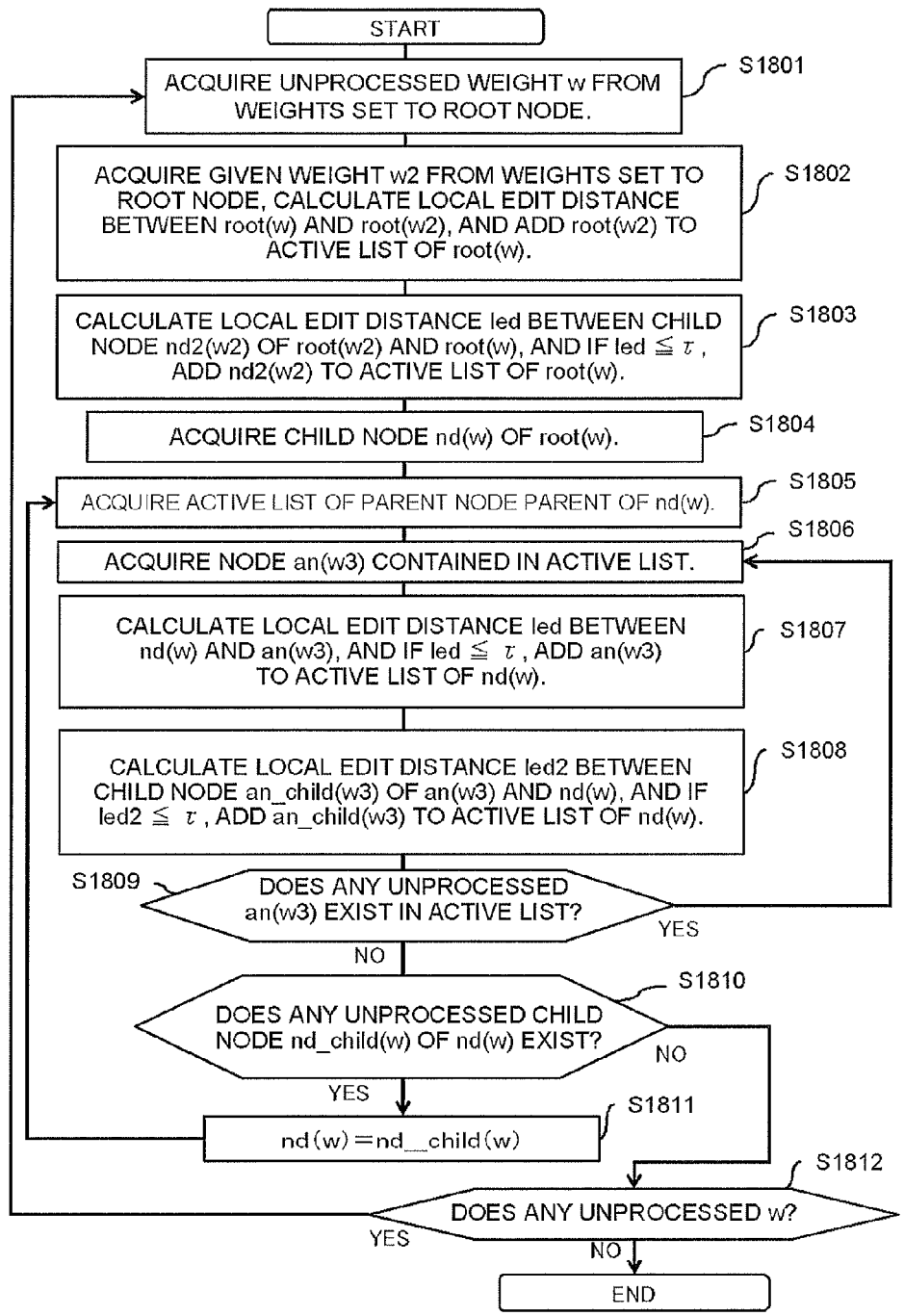
FIG. 18 is a flowchart showing an example of a process of searching a trie.

After the trie structuring unit 37 completes the process of structuring the above-described trie, the join processing unit 32 searches the structured trie to acquire the set of the local result tuples having the local edit distance less than or equal to the threshold value τ. FIG. 18 is a flowchart showing an example of a process of searching the trie. The join processing unit 32 performs the process shown in FIG. 18 for each of the tries.

The join processing unit 32 acquires the unprocessed weight w from the weights set in the root node (S1801).

Further, the join processing unit 32 acquires a given weight w2 from the weights set in the root node (S1802). The join processing unit 32 calculates a local edit distance between the root node with the weight w (hereinafter, referred to as a root(w)) and the root node with the weight w2 (hereinafter, referred to as a root(w2)) (S1802). The local edit distance is calculated through a method similar to that in the third exemplary embodiment. Since the root(w) and the root(w2) have the same label, the edit distance ED(root(w), root(w2)) is 0 (zero). Thus, the local edit distance led between the root(w) and the root(w2) is the larger weight value, in other words, is the string length of the head portion string (or tail portion string).

The join processing unit 32 adds the root(w2) to the active list of the root(w) (S1802). With this process, the node tuple concerning the root(w2) is set in the active list of the root(w). This node tuple contains the node number (0), the weight (w2), and the local edit distance between the root(w) and the root(w2). As described above, the local edit distance between the root nodes is the larger weight value, and hence, is always less than or equal to the threshold value τ. Thus, in the process S1802, the node tuples concerning the root (w2) is added to the active list without comparing the threshold value τ and the local edit distance.

Next, the join processing unit 32 calculates the local edit distance led between the root(w) and the child node nd2(w2) of the root(w2) (S1803). Here, the local edit distance between the nodes is calculated by adding the larger weight value to the edit distance between the strings through a path up to each of the nodes. In other words, the local edit distance between the root(w) and the node nd2(w2) is a value obtained by adding the larger weight value of the weigh w and the weight w2 to the edit distance between the character attached to the label of the root(w) and the string formed by the label of the root(w), and the label of the node nd2(w2).

If the calculated local edit distance led is less than or equal to the threshold value τ, the join processing unit 32 adds the node nd2(w2) to the active list of the root(w) (S1803). With this process, the node tuple concerning the node nd2(w2) is added to the active list of the root(w). This node tuple includes the node number concerning the node nd2(w2), the weight (w2), and the calculated local edit distance led.

It should be noted that, if plural child nodes nd2(w2) of the root(w2) exist, the join processing unit 32 performs the process S1803 to each of the child nodes. Further, if plural weights are set to the root node, the join processing unit 32 performs the processes S1802 and S1803 described above for each of the weights (w2). Then, the generation of the active list of the root(w) completes.

The join processing unit 32 sequentially generates the active lists of the descendant node nd(w) of the root(w) in a recursive manner. First, the join processing unit 32 acquires each of the child node nd(w) of the root(w) (S1804).

The join processing unit 32 acquires the active list of the parent node of the acquired child node nd(w) (S1805), and acquires the node an(w3) set in the active list (S1806).

The join processing unit 32 calculates the local edit distance led between the node nd(w) and the node an(w3), and if the calculated local edit distance led is less than or equal to the threshold value τ, adds the node an(w3) to the active list of the node nd(w) (S1807).

Further, the join processing unit 32 calculates the local edit distance led2 between the node nd(w) and each of the child nodes an child(w3) of the node an(w3), and if the calculated local edit distance led2 is less than or equal to the threshold value τ, adds the node an child(w3) to the active list of the node nd(w) (S1808).

The join processing unit 32 judges whether there exists any unprocessed node an(w3) in the active list of the parent node of the node nd(w) (S1809). If the unprocessed node an(w3) exists (S1809; YES), the join processing unit 32 performs the process S1806 described above and thereafter for the unprocessed node an(w3).

If the unprocessed node an(w3) does not exist (S1809; NO), the join processing unit 32 judges whether there exists any unprocessed child node nd_child(w) in the node nd(w) (S1810). If the unprocessed child node nd_child(w) exists (S1810; YES), the join processing unit 32 sets the unprocessed child node nd_child(w) to be the node nd(w) serving as the processing target (S1811), and performs the process S1805 described above and thereafter.

If no unprocessed child node nd_child(w) exists (S1810; NO), the join processing unit 32 judges whether there exists any unprocessed weight w' in the root node (S1812). If the unprocessed weight w' exists (S1812; YES), the join processing unit 32 performs the process S1801 described above and thereafter for the unprocessed weight. On the other hand, if no unprocessed weight w' exists (S1812; NO), the join processing unit 32 terminates its process.

With the processes described above, the join processing unit 32 generates the active list for each of the nodes in the trie. FIG. 19 is a diagram illustrating an example of the active list. FIG. 19 illustrates the active list of the root node, the node (1), the node (2), and the node (3) with the weight (0) in the tire tree_a for the character "a" in the example illustrated in FIG. 15. The underlines applied in FIG. 19 indicate that the corresponding node has the tuple pointer.

The join processing unit 32 identifies pairs of nodes including the node (3) and having the local edit distance less than or equal to the threshold value τ on the basis of the active list of the node (3) containing the tuple pointer. In the example illustrated in FIG. 19, the join processing unit 32 can acquire the pair of the node (3) and the node (3), the pair of the node (3) and the node (9), and the pair of the node (3) and the node (6). On the basis of the node tuples in the active list, the join processing unit 32 generates the local result tuple including the pair of tuple pointers and the local edit distance for the pairs of the nodes identified as described above. As described above, the join processing unit 32 uses the active list of all the edge nodes, thereby being able to acquire the local join result.

[Operation and Effect of Fourth Exemplary Embodiment]

In the fourth exemplary embodiment, the join processing device 30 maps the SIP tuples distributed from the data management device 20 to the trie. In the trie, the string length of the head portion string or the tail portion string contained in the SIP tuple is used as the weight, the root node having at least one child node is generated for each of the weight, and the tuple pointer together with the weight is attached to the edge node (leaf node).

The local edit distance between a node and another node selected on the basis of the active list of the parent node is calculated for each of the nodes of the structured trie, and the calculated local edit distance is compared with the threshold value $\tau$. As a result, information on the other node having the local edit distance less than or equal to the threshold value $\tau$ is set in the active list of each of the nodes.

As described above, according to the fourth exemplary embodiment, by using the characteristics of the trie to select the target of the join process for each of the nodes on the basis of the active list of the parent node, it is possible to limit the number of targets that require calculation of the local edit distance, so that the amount of calculation of the join process can be reduced. Further, according to the fourth exemplary embodiment, the local edit distance is calculated using the tail portion string or the head portion string, whereby it is possible to reduce the processing cost as compared with the conventional method that requires calculation of the edit distance for all the join key strings.

Further, according to the fourth exemplary embodiment, the active list of each of the nodes contains information on another node having the local edit distance from each of the nodes less than or equal to the threshold value, and also contains its local edit distance. Thus, according to the fourth exemplary embodiment, by referring to the active list of each of the edge nodes, it is possible to rapidly acquire the local result tuples having the local edit distance less than or equal to the threshold value $\tau$.

Modification Example

In the exemplary embodiments described above, ($\tau$+1) pieces of SIP tuples are generated for one tuple. Then, the plural SIP tuples generated from the one tuple have the same head character of the tail portion string (same tail character of the head portion string), and hence, are possibly distributed to the same join processing device 30. For example, in the example illustrated in FIG. 9C, two SIP tuples having the tuple pointer of "R: 203" are distributed to the same join processing device 30. In this case, only by obtaining the SIP tuple having the tail portion string of "ZZX-BB-KC" and the string length of the head portion string of "0 (zero)," the join processing device 30 can generate, on the basis of the obtained SIP tuple, the SIP tuple itself having the tail portion string of "ZX-BB-KC" and the string length of the head portion string of "1."

Thus, the SIP tuple generating unit 21 of the data management device 20 may generate only the SIP tuple having the minimum string length of the remaining head portion string for the SIP tuple having the same head character of the tail portion string. In this case, it is only necessary for the join processing device 30 to generate the required another SIP tuple on the basis of the received SIP tuple.

In the example illustrated in FIG. 9C, the data management device 20 generates a SIP tuple having the tail portion string of "ZZX-BB-KC" and the string length of the head portion string of "0 (zero)", and does not generate the SIP tuple having the same head character of the tail portion string (SIP tuple having the tail portion string of "ZX-BB-KC" and the string length of the head portion string of "1"). Upon receiving this SIP tuple, the join processing device 30 determines that the SIP tuple that is not generated by the data management device 20 is necessary, on the basis of the relationship between the string "ZZX-BB-KC," the string length (0), and the threshold value $\tau$. Thus, the join processing device 30 generates the SIP tuple having the tail portion string "ZX-BB-KC" and the string length of the head portion string of "1," and then, starts the join process.

With the configuration described above, it is possible to further reduce the communication cost in the system 1.

Further, in the exemplary embodiments described above, the request controlling unit 11 of the system controlling device 10 acquires a processing request, then, in response to the execution instruction transmitted by the request controlling unit 11, the data management device 20 distributes the SIP tuples, and the join processing device 30 starts the process. As another configuration, it may be possible to employ a configuration in which, before the processing request is received, the data management device 20 distributes the SIP tuple satisfying a predetermined condition to the join processing device 30 in advance.

More specifically, by setting the edit distance threshold value $\tau$ to be the upper limit value $\max\_\tau$, the data management device 20 generates the SIP tuple ($1 \le i \le \max\_\tau + 1$) in the case where the threshold value $\tau$ is the upper limit value, and distributes the generated SIP tuple in advance. Upon receiving the processing request containing the threshold value $\tau$, the system controlling device 10 issues the execution instruction only to the join processing device 30. The join processing device 30 performs the join process using only the SIP tuple having the string length of the head portion string (or tail portion string) less than or equal to the threshold value $\tau$ of all the SIP tuples distributed in advance.

With this configuration, the time required for performing the process of transmitting distribution data from the data management device 20 to the join processing device 30 is not contained in the period of time from a time when the processing request is received to a time when the join process result is generated. Thus, it is possible to reduce the time from reception of the processing request to generation of the join process result. This configuration is suitable for the online process in which the large number of processing requests are inputted within a short period of time.

[Additional Note]

From among at least one piece of data (SIP tuple set) stored in at least one data management device 20 and specified on the basis of the processing request, the similarity join process performed in the exemplary embodiments described above and the modification example detects pairs of tuples whose edit distance between the strings in the join key attribute specified on the basis of the processing request satisfies the condition of the threshold value $\tau$. However, the similarity join process according to the present invention is not limited to such a configuration, and is an idea including the meaning of a string similarity searching process.

In other words, the similarity join process according to the present invention may be a process of searching at least one item of data stored in at least one data management device 20 for a tuple formed by a query string obtained, for example, through a processing request and having the edit distance between the query strings satisfying the condition of the threshold value $\tau$.

In this configuration, the data management device 20 retaining the data specified by the processing request generates and distributes the SIP tuple in a similar manner to the exemplary embodiments described above and the modification example. On the other hand, the data management device 20 acquiring the query string acquired from the system controlling device 10 generates the SIP tuple concerning this query string, and distributes it. The join processing device 30 receiving the SIP tuple concerning the query string performs a join process similar to that in the exemplary embodiments described above and the modification example for the pair of the SIP tuple concerning the query string and another SIP tuple.

Further, the similarity join process according to the present invention is an idea including a name-consolidating technique of detecting strings having the same meaning but expressed in slightly different ways.

Further, the string similarity join system 1 described in the exemplary embodiments and the modification example is applicable to a stock searching system for plural stores. With such a configuration, even if the name of product slightly differs according to shops, it is possible to detect the desired merchandise. Further, there is a case where the product number differs according to merchandise since color or size thereof is different although the type of the merchandise is the same. In such a case, with this configuration, it is possible to detect the merchandise with the same model but different colors or sizes.

It should be noted that, in the plural flowcharts used in the description above, plural steps (processes) are described in a sequential order. However, the order of the process steps performed in the exemplary embodiments is not limited to the order of the steps described. In the exemplary embodiments, the order of the process steps illustrated in the drawings may be exchanged, provided that the exchange does not impair the details of the processes. The above-described exemplary embodiments and the modification example may be combined, provided that the details thereof do not contradict each other.

Part or all of the exemplary embodiments and the modification example can be described in a manner illustrated in the Supplementary Notes below. However, the exemplary embodiments and the modification example are not limited to the descriptions below.

(Supplemental Note 1)

A join processing device that performs a similarity join process to plural tuples using an edit distance threshold value $\tau$ (positive integer), including a join processing units that excludes, from a target of edit distance calculation, a pair of tuples that does not have any common character in an end portion ranging from a head character or a tail character to the ($\tau$+1)th character in a join key string in each of the plural tuples.

(Supplemental Note 2)

A data management device communicatively connected to plural join processing devices that each perform a similarity join process to plural tuples using an edit distance threshold value $\tau$ (positive integer), including;

a data storage unit that stores the plural tuples; and a data distributing unit that determines a distribution destination of each of the tuples stored in the data storage unit to be a join processing device that processes each of the tuples from among the plural join processing devices in a manner such that each of the tuples is distributed to the distribution destination the same as that of another tuple containing, in an end portion ranging from a head character or tail character to a ($\tau$+1)th character in a join key string thereof, at least one character that the each of the tuples contains in the end portion in the join key string thereof, and is not distributed to a distribution destination the same as that of another tuple that does not contain any character common to that in the end portion in the join key characters string of each of the tuples.

(Supplemental Note 3)

A string similarity join system including at least one data management device and plural join processing devices that each perform a similarity join process to plural tuples stored in the data management device using an edit distance threshold value $\tau$ (positive integer)

the at least one data management device including:

a key information generating unit that generates, for a join key string of each of the tuples, ($\tau$+1) pieces of key information tuples containing a combination of a tail portion string ranging from a tail character to an i-th character (i is a positive integer less than or equal to ($\tau$+1)) counted from a head character, a string length of the remaining head portion string, and tuple identifying data, or a combination of a head portion string ranging from the head character to an i-th character counted from the tail character, a string length of the remaining tail portion string, and the tuple identifying data; and a data distributing unit that determines a distribution destination for each of the key information tuples on the basis of the head character of the tail portion string or the tail character of the head portion string contained in each of the key information tuples generated by the key information generating unit, and distributes, as data on each of the tuples, each of the key information tuples to each of the join processing devices determined to be the distribution destination, the plural join processing devices each including:

a receiving unit that receives the plural key information tuples distributed from the at least one data management device; and a join processing unit that performs the similarity join process for each set of key information tuples having the head character of the tail portion string or the tail character of the head portion string common to each other from among the plural key information tuples received by the receiving unit.

(Supplemental Note 4)

The string similarity join system according to Supplemental Note 3, the plural join processing devices each further including:

an estimation value calculating unit that calculates an edit distance between tail portion strings or head portion strings as a partial string edit distance for each pair of the plural key information tuples received by the receiving unit, and adds up the partial string edit distance and a string length of a larger head portion string or a string length of a larger tail portion string for each pair of key information tuples having the calculated partial string edit distance satisfying a condition of the edit distance threshold value $\tau$, thereby calculating an edit distance estimation value, in which the join processing unit identifies a pair of tuples having the edit distance estimated to satisfy the condition of the edit distance threshold value $\tau$ on the basis of a comparison result between the edit distance estimation value calculated by the estimation value calculating unit and the edit distance threshold value $\tau$.

(Supplemental Note 5)

The string similarity join system according to Supplemental Note 3, the plural join processing devices each further including:

a trie structuring unit that structures a trie having the tail portion string or the head portion string mapped to a branch extending from a root node to an edge node, the trie managing a string length of the head portion string or the tail portion string as a weight value on the basis of the plural key information tuples received by the receiving unit, in which the join processing unit:

adds up, for each target node contained in the trie structured by the trie structuring unit, an edit distance between a string identified on the basis of a target node and another string identified on the basis of another node, and a greater weight value of a weight value of the target node and a weight value of the other node, thereby calculating an edit distance estimation value for the other node;

sets, for each target node, a list containing information on the other node having the edit distance estimation value satisfying the condition of the edit distance threshold value τ and the edit distance estimation value; and identifies a pair of tuples having the edit distance estimated to satisfy the condition of the edit distance threshold value τ on the basis of the list set to the edge node.

(Supplemental Note 6)

The string similarity join system according to Supplemental Note 5, in which the join processing unit selects another node serving as a calculation target of the edit distance estimation value of each target node on the basis of information on the other node contained in the list of a parent node.

(Supplemental Note 7)

The string similarity join system according to Supplemental Note 5 or 6, in which the trie structuring unit maps tail portion strings or head portion strings of plural key information tuples having the same tuple identifying data to one branch of the trie and at least one portion of the branch, and sets the weight value together with a node pointer for identifying the at least one portion of the one branch in the root node of the trie.

(Supplemental Note 8)

The string similarity join system according to any one of Supplemental Notes 4 to 7, further including a system controlling device that can communicate to the at least one data management device and the plural join processing devices, in which the join processing unit of the join processing device generates, for each identified pair, a result tuple containing a pair of tuple identifying data and an edit distance estimation value, and transmits the generated result tuple to the system controlling device, and the system controlling device includes a result generating unit that detects an overlapping result tuple containing a pair of the same tuple identifying data from among plural result tuples transmitted from the plural join processing devices, and deletes a result tuple other than the result tuple having the minimum edit distance estimation value from the detected overlapping result tuple, thereby determining a pair of tuples having an edit distance satisfying the condition of the edit distance threshold value τ.

(Supplemental Note 9)

The string similarity join system according to any one of Supplemental Notes 3 to 8, in which the system controlling device further includes a request controlling unit that acquires a processing request containing the edit distance threshold value τ, and then, transmits an execution instruction for processing to each of the plural join processing devices, in which the key information generating unit of the at least one data management device generates a temporary key information tuple for a join key string of each of the tuples on the assumption that the upper limit value of the edit distance threshold value τ determined in advance is the edit distance threshold value τ, and the data distributing unit of the at least one data management device distributes the temporary key information tuple to the join processing device serving as a distribution destination before the system controlling device acquires the processing request.

(Supplemental Note 10)

A string similarity join method performed for plural tuples using an edit distance threshold value τ (positive integer), in which at least one computer excludes, from a target of an edit distance calculation, a pair of tuples that does not have any common character in an end portion ranging from a head character or a tail character to the (τ+1)th character in a join key string of each of the tuples.

(Supplemental Note 11)

A string similarity join method performed for plural tuples using an edit distance threshold value τ (positive integer), the method being performed by at least one computer and including:

generating (τ+1) pieces of key information tuples containing a combination of a tail portion string ranging from a tail character to a i-th character (i is a positive integer less than or equal to (τ+1)) counted from a head character in a join key string of each of the tuples, a string length of the remaining head portion string, and tuple identifying data, or a combination of a head portion string ranging from the head character i-th character counted from the tail character, a string length of the remaining tail portion string, and the tuple identifying data;

determining a distribution destination of each of the key information tuples on the basis of the head character of the tail portion string or the tail character of the head portion string contained in each of the generated key information tuples; and distributing, as data on each of the tuples, each of the key information tuples to each target computer determined to be the distribution destination of each of the key information tuples, in which the target computer determined to be the distribution destination of each of the key information tuples receives the distributed key information tuples, and performs a similarity join process for each set of key information tuples having the head character of the tail portion string or the tail character of the head portion string common to each other from among the received key information tuples.

(Supplemental Note 12)

The string similarity join method according to Supplemental Note 11, in which the target computer determined to be the distribution destination of each of the key information tuples further:

calculates, as a partial string edit distance, an edit distance between tail portion strings or head portion strings for each pair of the received plural key information tuples;

adds up the partial string edit distance and a string length of a larger head portion string or a string length of a larger tail portion string for each pair of key information tuples having the calculated partial string edit distance satisfying the condition of the edit distance threshold value τ, thereby calculating an edit distance estimation value; and identifies a pair of tuples having an edit distance estimated to satisfy the condition of the edit distance threshold value τ on the basis of a comparison result between the calculated edit distance estimation value and the edit distance threshold value τ.

(Supplemental Note 13)

The string similarity join method according to Supplemental Note 11, in which the target computer determined to be the distribution destination of each of the key information tuples further:

structures a trie having the tail portion string or the head portion string mapped to a branch extending from a root node to an edge node, the trie managing a string length of the head portion string or the tail portion string as a weight value on the basis of the received plural key information tuples;

adds up, for each target node contained in the structured trie, an edit distance between a string identified on the basis of a target node and a string identified on the basis of another node, and a greater weight value of a weight value of the target node and a weight value of the other node, thereby calculating an edit distance estimation value for the other node;

sets, for each target node, a list containing information on the other node having the edit distance estimation value satisfying the condition of the edit distance threshold value τ and the edit distance estimation value; and identifies a pair of tuples having the edit distance estimated to satisfy the condition of the edit distance threshold value τ on the basis of the list set to the edge node.

(Supplemental Note 14)

The string similarity join method according to Supplemental Note 13, in which the edit distance estimation value is calculated in a manner such that another node serving as a calculation target for the edit distance estimation value for each target node is selected on the basis of information on another node contained in a list set for a parent node.

(Supplemental Note 15)

The string similarity join method according to Supplemental Note 13 or 14, in which the trie is structured in a manner such that tail portion strings or head portion strings of plural key information tuples having the same tuple identifying data are mapped to one branch of the trie and at least one portion of the one branch, and the weight value and a node pointer for identifying the at least one portion of the one branch are set in the root node of the trie.

(Supplemental Note 16)

The string similarity join method according to any one of Supplemental Notes 12 to 15, in which the target computer determined to be the distribution destination of each of the key information tuples further:

generates a result tuple containing a pair of tuple identifying data and an edit distance estimation value for the identified pair; and transmits the generated result tuple to another computer; the other computer:

detects an overlapping result tuple containing a pair of the same tuple identifying data from among plural result tuples transmitted from the target computer; and deletes a result tuple other than a result tuple having the minimum edit distance estimation value from among the detected overlapping result tuple, thereby determining a pair of tuples having the edit distance satisfying the condition of the edit distance threshold value τ.

(Supplemental Note 17)

A program that causes at least one computer to perform a string similarity join to plural tuples using an edit distance threshold value τ (positive integer), in which the program causing the at least one computer to realize a join processing unit that excludes, from a target of an edit distance calculation, a pair of tuples that do not have any common character in an end portion ranging from a head character or a tail character to a (τ+1)th character in a join key string of each of the tuples.

(Supplemental Note 18)

A program that causes at least one computer to perform a string similarity join to plural tuples using an edit distance threshold value τ (positive integer), in which the program causes the at least one computer to realize:

a key information generating unit that generates, for a join key string of each of the tuples, (τ+1) pieces of key information tuples containing a combination of a tail portion string ranging from a tail character to an i-th character (i is a positive integer less than or equal to (τ+1)) counted from a head character, a string length of the remaining head portion string, and tuple identifying data, or a combination of a head portion string ranging from the head character to an i-th character counted from the tail character, a string length of the remaining tail portion string, and the tuple identifying data; and a data distributing unit that determines a distribution destination of each of the key information tuples on the basis of the head character of the tail portion string or the tail character of the head portion string contained in each of the key information tuples generated by the key information generating unit, and distributes, as data on each of the tuples, each of the key information tuples to each target computer determined to be the distribution destination, and the program causes the target computer determined to be the distribution destination of each of the key information tuples to realize:

a receiving unit that receives the plural key information tuples distributed from the at least one computer; and a join processing unit that performs the similarity join process for each set of key information tuples having the head character of the tail portion string or the tail character of the head portion string common to each other from among the plural key information tuples received by the receiving unit.

(Supplemental Note 19)

The program according to Supplemental Note 18, which causes the target computer determined to be the distribution destination of each of the key information tuples to realize:

an estimation value calculating unit that calculates an edit distance between tail portion strings or head portion strings as a partial string edit distance for each pair of plural key information tuples received by the receiving unit, and adds up the partial string edit distance and a string length of a larger head portion string or a string length of a larger tail portion string for each pair of key information tuples having the calculated partial string edit distance satisfying a condition of the edit distance threshold value τ, thereby calculating an edit distance estimation value a join processing unit that identifies a pair of tuples having the edit distance estimated to satisfy the condition of the edit distance threshold value τ on the basis of a comparison result between the edit distance estimation value calculated by the estimation value calculating unit and the edit distance threshold value τ.

(Supplemental Note 20)

The program according to Supplemental Note 18, which causes the target computer determined to be the distribution destination of each of the key information tuples to realize:

a trie structuring unit that structures a trie having the tail portion string or the head portion string mapped to a branch extending from a root node to an edge node, the trie managing a string length of the head portion string or the tail portion string as a weight value on the basis of the plural key information tuples received by the receiving unit;

a join processing unit that:

adds up, for each target node contained in the trie structured by the trie structuring unit, an edit distance between a string identified on the basis of a target node and another string identified on the basis of another node, and a greater weight value of a weight value of the target node and a weight value of the other node, thereby calculating an edit distance estimation value for the other node;

sets, for each target node, a list containing information on the other node having the edit distance estimation value satisfying the condition of the edit distance threshold value τ and the edit distance estimation value; and identifies a pair of tuples having the edit distance estimated to satisfy the condition of the edit distance threshold value τ on the basis of the list set to the edge node.

(Supplemental Note 21)

A computer-readable storage medium that stores a program according to any one of Supplemental Notes 17 to 20.

The present application claims priority based on Japanese Patent Application No. 2011-020374 filed in Japan on Feb. 2, 2011, the disclosures of which are incorporated herein by reference in their entirety.

The invention claimed is:

1. A data management device, which is communicatively connected to a plurality of join processing devices, comprising:

a data storage unit that stores a plurality of tuples, each of the tuples comprising a join key string; and a data distributing unit that determines, for each of the tuples stored in the data storage unit, one of the join processing devices as a transmission destination, the tuple being transmitted to the transmission destination determined for the tuple, the join processing device performing a similarity join process to the tuples transmitted thereto using an edit distance threshold value τ (positive integer), wherein the data distributing unit performs the determination so that the tuples being transmitted to a same join processing device have at least one same character as each other in a head portion or a tail portion of the join key strings of the tuples, the head portion of the join key string ranging from a head character of the join key string to a (τ+1)th character of the join key string, the tail portion of the join key string ranging from a (N−τ)th character of the join key string to a Nth character of the join key string wherein N is a length of the join key string.

2. A string similarity join system comprising at least one data management device and a plurality of join processing devices that each perform a similarity join process to a plurality of tuples stored in the at least one data management device using an edit distance threshold value τ (positive integer), the at least one data management device comprising:

a key information generating unit that generates, for a join key string of each of the tuples, a key information tuple containing a first combination, which includes:

a tail portion of the join key string;

a length of a first rest portion of the join key string; and tuple identifying data, or a second combination, which includes:

a head portion of the join key string;

a length of a second rest portion of the join key string; and the tuple identifying data, the tail portion of the join key string ranging from an i-th character to a tail character of the join key string, the first rest portion of the join key string ranging from a head character to (i−1)-th character of the join key string, the head portion of the join key string ranging from a head character to a i-th character of the join key string, the second rest portion of the join key string ranging from a (i+1)-th character to a tail character of the join key string, the key information tuple being generated for each of integer values i ranging from 1 to τ+1; and a data distributing unit that determines, for each of the key information tuples, one of the join processing devices as a transmission destination based on the head character of the tail portion of the join key string or the tail character of the head portion of the join key string included in each of the key information tuples generated by the key information generating unit, and distributes each of the key information tuples to the transmission destination thereof, and the plurality of join processing devices each comprising:

a receiving unit that receives the plurality of key information tuples distributed from the at least one data management device; and a join processing unit that performs the similarity join process for each set of the received key information tuples, the tail portion of the join key string of which has a same head character as each other, or the head portion of the join key string of which has a same tail character as each other.

3. The string similarity join system according to claim 2, the plurality of join processing devices each further comprising:

an estimation value calculating unit that calculates an edit distance between tail portions of the join key string or head portions of the join key string as a partial string edit distance for each pair of the plurality of key information tuples received by the receiving unit, and adds up the partial string edit distance and a length of a larger head portion of the join key string or a length of a larger tail portion of the join key string for each pair of key information tuples having the calculated partial string edit distance satisfying a condition of the edit distance threshold value τ, thereby calculating an edit distance estimation value, wherein the join processing unit identifies a pair of tuples having the edit distance estimated to satisfy the condition of the edit distance threshold value τ based on a comparison result between the edit distance estimation value calculated by the estimation value calculating unit and the edit distance threshold value τ.

4. The string similarity join system according to claim 3, further comprising a system controlling device that can communicate to the at least one data management device and the plural join processing devices, wherein the join processing unit of the join processing device generates, for each identified pair, a result tuple containing a pair of tuple identifying data and an edit distance estimation value, and transmits the generated result tuple to the system controlling device, and the system controlling device includes a result generating unit that detects an overlapping result tuple containing a pair of the same tuple identifying data from among plural result tuples transmitted from the plural join processing devices, and deletes a result tuple other than the result tuple having the minimum edit distance estimation value from the detected overlapping result tuple, thereby determining a pair of tuples having an edit distance satisfying the condition of the edit distance threshold value τ.

5. The string similarity join system according to claim 2, the plurality of join processing devices each further comprising:

a trie structuring unit that structures a trie having the tail portion of the join key string or the head portion of the join key string mapped to a branch extending from a root node to an edge node, said trie managing a length of the head portion of the join key or the tail portion of the join key as a weight value on the basis of the plurality of key information tuples received by the receiving unit, wherein the join processing unit:

adds up, for each target node contained in the trie structured by the trie structuring unit, an edit distance between a string identified based on a target node and another string identified based on another node, and a greater weight value of a weight value of the target node and a weight value of the other node, thereby calculating an edit distance estimation value for the other node;

sets, for each target node, a list containing information on the other node having the edit distance estimation value satisfying the condition of the edit distance threshold value τ and the edit distance estimation value; and identifies a pair of tuples having the edit distance estimated to satisfy the condition of the edit distance threshold value τ on the basis of the list set to the edge node.

6. The string similarity join system according to claim 5, wherein the join processing unit selects another node serving as a calculation target of the edit distance estimation value of each target node based on information on the other node contained in the list of a parent node.

7. The string similarity join system according to claim 5, wherein the trie structuring unit maps tail portions of the join key string or head portions of the join key string of plural key information tuples having the same tuple identifying data to one branch of the trie and at least one portion of the one branch, and sets the weight value and a node pointer for identifying the at least one portion of the one branch in the root node of the trie.

8. A data management method performed by connecting a plurality of join processing devices, the method comprising:

storing a plurality of tuples, each of the tuples comprising a join key string; and determining, for each of the stored tuples, one of the join processing devices as a transmission destination, transmitting the tuple to the transmission destination determined for the tuple, performing a similarity join process to the tuples transmitted thereto using an edit distance threshold value τ (positive integer), wherein the determining comprises performing the determination so that the tuples being transmitted to a same join processing device have at least one same character as each other in a head portion or a tail portion of the join key strings of the tuples, the head portion of the join key string ranging from a head character of the join key string to a (τ+1)th character of the join key string, the tail portion of the join key string ranging from a (N−τ)th character of the join key string to a Nth character of the join key string wherein N is a length of the join key string.

9. A non-transitory computer-readable storage medium storing a program for causing at least one computer to perform a data management method by connecting a plurality of join processing devices, the method comprising:

storing a plurality of tuples, each of the tuples comprising a join key string; and determining, for each of the stored tuples, one of the join processing devices as a transmission destination, transmitting the tuple to the transmission destination determined for the tuple, performing a similarity join process to the tuples transmitted thereto using an edit distance threshold value τ (positive integer), wherein the determining comprises performing the determination so that the tuples being transmitted to a same join processing device have at least one same character as each other in a head portion or a tail portion of the join key strings of the tuples, the head portion of the join key string ranging from a head character of the join key string to a (τ+1)th character of the join key string, the tail portion of the join key string ranging from a (N−τ)th character of the join key string to a Nth character of the join key string wherein N is a length of the join key string.

* * * * *

UNITED STATES PATENT AND TRADEMARK OFFICE
CERTIFICATE OF CORRECTION

PATENT NO. : 9,535,954 B2
APPLICATION NO. : 13/983373
DATED : January 3, 2017
INVENTOR(S) : Kazuyo Narita It is certified that error appears in the above-identified patent and that said Letters Patent is hereby corrected as shown below:

In the Specification

Column 20, Line 15 (Equation 7):
"LED(x,y)=ED(xt_i,yt_i)+max(|xh_i|,|yh_|)",
Should be:
--LED(x,y)=ED(xt_i,yt_i)+max(|xh_i|,|yh_i|)--.

Signed and Sealed this
Twelfth Day of June, 2018

Andrei Iancu
*Director of the United States Patent and Trademark Office*